(12) United States Patent
Baker et al.

(10) Patent No.: US 6,469,133 B2
(45) Date of Patent: Oct. 22, 2002

(54) PROCESS FOR THE PREPARATION OF POLYMERS OF DIMERIC CYCLIC ESTERS

(75) Inventors: Gregory L. Baker, Haslett, MI (US); Milton R. Smith, III, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 09/736,991

(22) Filed: Dec. 13, 2000

(65) Prior Publication Data

US 2001/0044514 A1 Nov. 22, 2001

Related U.S. Application Data

(60) Provisional application No. 60/170,425, filed on Dec. 13, 1999.

(51) Int. Cl.$^7$ .......................... C08G 63/08; C08G 63/82
(52) U.S. Cl. .......................... 528/354; 528/357; 525/415
(58) Field of Search ................................ 525/415, 437; 528/354, 357, 184, 328, 274, 483, 503; 526/86, 90

(56) References Cited

U.S. PATENT DOCUMENTS

| | | | |
|---|---|---|---|
| 3,960,152 A | | 6/1976 | Augurt et al. |
| 4,057,537 A | | 11/1977 | Sinclair |
| 5,028,667 A | * | 7/1991 | McLain et al. ............. 525/415 |
| 5,053,485 A | | 10/1991 | Nieuwenhuis et al. |
| 5,053,522 A | * | 10/1991 | Muller ...................... 549/274 |
| 5,076,983 A | | 12/1991 | Loomis et al. |
| 5,196,551 A | | 3/1993 | Bhatia et al. |
| 5,225,129 A | * | 7/1993 | van den Berg ............... 264/85 |
| 5,235,031 A | * | 8/1993 | Drysdale et al. ............ 528/354 |
| 5,274,127 A | | 12/1993 | Sinclair et al. |
| 5,319,107 A | | 6/1994 | Benecke et al. |
| 5,332,839 A | | 7/1994 | Benecke et al. |
| 5,359,027 A | | 10/1994 | Perego et al. |
| 5,801,223 A | * | 9/1998 | Lipinsky et al. ............ 528/354 |

FOREIGN PATENT DOCUMENTS

| | | | | |
|---|---|---|---|---|
| JP | 05009273 | * | 1/1993 | ........... C08G/63/08 |

OTHER PUBLICATIONS

E. Chiellini et al., Adv. Mater. 1996, 8, No. 4 pp. 305–313.
A. Thayer, Chemical & Engineering News, Aug. 18, 1997, pp. 14–20.
A.G. Pinkus et al., Journal of Polymer Science. vol. 27, pp. 4291–4296 (1989).
A. J. Domb, Journal of Polymer Science, vol. 31, pp. 1973–1981 (1993).
J.K. Whitesell et al., Chem. Mater. 1990, vol. 2 pp. 248–254.
T. Okada et al., Journal of Organometallic Chemistry, 54, pp. 149–152 (1973).
S. Kobayashi et al., Polymer Bulletin 3, pp. 585–591 (1980).
I.J. Smith et al., Makromol. Chem., 182 pages 313–324 (1981).
K. Imasaka et al., International Journal of Pharmaceutics, 81, pp. 31–38 (1992).
H. Fukuzaki et al., Eur. Polym. J. vol. 26, No. 12 pp. 1273–1277 (1990).
H. Fukuzaki et al., Makromol. Chem., 190, pp. 2407–2415 (1989).
A. Kowalski et al., Macromolecules 2000, 33, pp. 1964–1971 (2000).
J. Kylma et al., J. Appl. Polym. Sci. 63: pp. 1865–1872 (1997).
A. Duda et al. Macromolecules, 23, pp. 1636–1639 (1990).
D. R. Witzke et al., Macromolecules, 30, pp. 7075–7085 (1997).
J.K. Whitesell et al., J. Org. Chem. 48, pp. 3548–3551 (1983).
V. Aljons Schoberl et al., Vorlauf. Mitt. Angew. Chem., 64: 82, pp. 101–131 (1952).
M. Cheng et al., J. Am. Chem. Soc., 121, pp. 11583–11584 (1999).
T.M. Ovitt et al., J. Am. Chem. Soc., 121, pp. 4072–4073 (1999).
M. Yin et al., Macromolecules, vol. 32, No. 23, pp. 7711–7718 (1999).

* cited by examiner

Primary Examiner—David W. Wu
Assistant Examiner—Tanya Zalukaeva
(74) Attorney, Agent, or Firm—Ian C. McLeod

(57) ABSTRACT

The present invention provides a process for the direct synthesis of high melting polymers made from dimeric cyclic esters. In particular, the present invention provides a process for synthesis of polylactic acid (PLA) from racemic materials such as racemic lactide and polymandelide from mandelide. The process further provides racemic metal organic ligand catalysts such as racemic salbinap that catalyzes the polymerization of racemic dimeric cyclic ester monomers to a polylactide stereocomplex. Polymandelide and mixed dimeric cyclic esters are also prepared in the presence of low amounts of water.

25 Claims, 29 Drawing Sheets

(−)-1, R = Me
(−)-2, R = $^i$Pr

R = Me, Et, $^i$Pr, $^t$Bu, Ph

...ABABABABAB...   ...ABABBABAABAB...

R = H, CH$_3$, CH$_2$CH$_3$, (CH$_2$)$_5$CH$_3$, CH(CH$_3$)$_2$, C$_6$H$_5$

R = H, CH₃, Br, t-Bu, ...

| R₁ | R₂ | $T_g$ |
|---|---|---|
| $CH_3$ | H | 35-55 |
| $CH_2CH_3$ | H | 25 |
| $C_6H_5$ | H | 46 |
| $CH_3$ | $CH_3$ | 78 |

(R, R)            (R, S)

Bernoullian Model

First-order Markov model

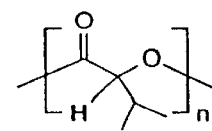
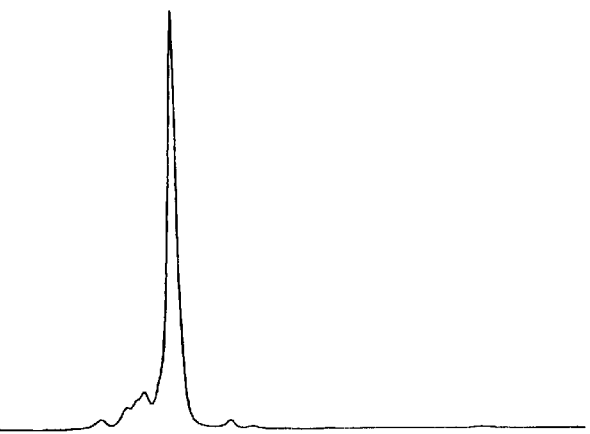
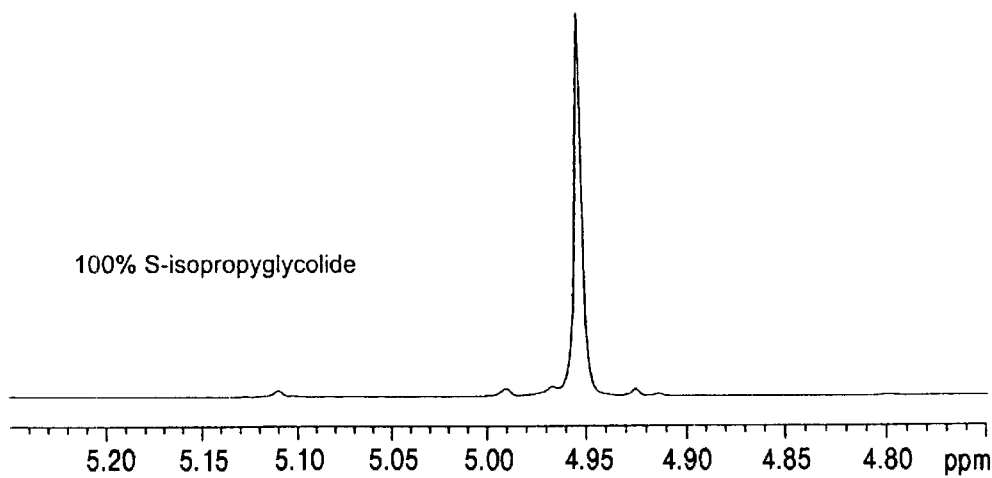
rac-isopropylglycolide
FIG. 30C
85% S-isopropylglycolide
15% rac-isopropylglycolide
FIG. 30B
100% S-isopropyglycolide
FIG. 30A

PROCESS FOR THE PREPARATION OF POLYMERS OF DIMERIC CYCLIC ESTERS

CROSS-REFERENCE TO RELATED APPLICATION

This application claims the benefit of U.S. Provisional Application No. 60/170,425 filed on Dec. 13, 1999.

STATEMENT REGARDING FEDERALLY SPONSORED RESEARCH OR DEVELOPMENT

None.

REFERENCE TO A "MICROFICHE APPENDIX"

Not Applicable.

BACKGROUND OF THE INVENTION

(1) Field of the Invention

The present invention relates to a process for the direct synthesis of polymers from dimeric cyclic esters. In particular, the present invention relates to polylactic acid (PLA or polylactide) from racemic lactide or a polymandelide from mandelide. The process particularly relates to a racemic metal organic ligand catalyst such as racemic salbinap that catalyzes the polymerization of racemic dimeric cyclic ester monomers such as poly(L-lactide) and poly(D-lactide) to a polylactide stereocomplex.

(2) Description of Related Art

Lactides

Poly(hydroxybutyrate) and poly(lactide) herein "polylactide" (Chiellini et al., Adv. Maters. 8: 305–313 (1996)) are among the most widely studied degradable polymer systems, and polylactide is now being commercialized as a commodity polymer for high volume commercial applications such as fibers and packaging materials (Thayer, Chem Eng. News 75: 14–16 (1997)). Polylactic acid (PLA) is an attractive polymer because it can be derived from renewable resources and provides a biodegradable alternative to polymers obtained from petrochemical sources (Sinclair, Macromol. Sci.-Pure Appl. Chem. A33: 585–597 (1996)). PLA is prepared by the ring opening polymerization (ROP) of lactide, the cyclic dimer of lactic acid. Currently, enantiopure L-lactide is required for preparing crystalline materials. Therefore, considerable effort has been expended in preparing L-lactide via fermentation routes. To date there have not been reported any examples where crystalline PLA has been prepared from a racemic mixture of D- and L-lactide using an achiral catalyst.

Commercial polylactides usually are synthesized from lactide monomers prepared from a single lactic acid enantiomer, and because the resulting polymers are stereoregular, they have high degrees of crystallinity (Huang et al., Macromols. 31: 2593–2599 (1998)). The mechanical properties of crystalline polymers are stable to near the polymer melting point, and thus they have higher use temperatures than their amorphous analogs. For example, polymerization of L-lactide gives a semicrystalline polymer with a melting transition near 180° C. and glass transition ($T_g$) of about 67° C. (Zhang et al., Macromol. Sci.-Rev. Macromol. Chem. Phys. C33: 81–102 (1993)), properties that make it useful for applications ranging from degradable packaging to surgical implants and matrices for drug delivery (Hollinger, Biochemical Applications of Synthetic Degradable Polymers; CRC Press: Boca Raton, Fla., 1995).

In contrast, the polymer derived from rac-lactide, a 1:1 mixture of D and L-lactide, yields amorphous polymers with glass transitions near room temperature. Although L-lactide can be prepared with relatively high enantiopurity from corn fermentation, the requirement for an enantiopure monomer places restrictions on the polymer synthesis.

Chiral catalysts have been employed to effect kinetic resolution of racemic lactide. For example, Spassky et al. (Macromol. Chem. Phys. 197: 2627–2637 (1996)) reported kinetic resolutions of rac-lactide by employing a chiral Schiff's base complex of aluminum, (–)-1. FIG. 1A shows a scheme for the polymerization of L-lactide and D-lactide to isotactic-L-PLA by catalyst (–)-1. The structure for catalyst (–)-1 is shown in FIG. 2 wherein R is a methyl group. At low conversions, high enantiomeric enrichment in the polymer was observed. In the kinetic resolution of rac-lactide by catalyst (–)-1, the enantiomeric excess at 20% conversion was 88% (Spassky et al., Macromol. Chem. Phys. 197: 2627–2637 (1996)). This indicated that the catalyst can override the tendency for syndiotactic placements that are typically favored by chain-end control (Thakur et al., Macromols. 31: 1487–1494 (1998)). At higher conversions, the enantiomeric enrichment in the polymer decreased. The drop in selectivity can be attributed to the fact that the relative concentration of the "wrong" isomer increases in the monomer pool as the desired enantiomer is incorporated in the polylactide.

In a recent report, Coates et al. effected the syndiotactic polymerization of meso-lactide by using the isopropoxide catalyst (–)-2 (Ovitt et al., J. Am. Chem. Soc. 121: 4072–4073 (1999)). The scheme for this reaction is shown in FIG. 1B. The structure for catalyst (–)-2 is shown in FIG. 2 wherein $^i$Pr is isopropoxide. Since meso-lactide possesses two stereocenters of opposite configuration, the concentration of D and L stereocenters remained constant and the intrinsic selectivity of the catalyst was not diminished by statistical depletion of the preferred stereocenter.

An interesting effect of stereoregularity on lactide properties was first reported by Tsuji and co-workers (Ikada et al., Macromols. 1987, 20: 904–906; Tsuji et al., Macromols. 24: 2719–2724 (1991); Brizzolara et al., Macromols. 29: 191–197 (1996)). As shown in FIG. 1C, upon mixing, L-PLA and D-PLA form a stereocomplex that has a $T_m$ 230° C., which is 50° C. higher than the $T_m$ for either of the homochiral D- or L-PLA polymers. Preparation of this stereocomplex presently requires parallel ROP of D- and L-lactide with subsequent combination of the chiral polylactide chains. Despite the improved mechanical properties of the stereocomplex, practical applications of the stereocomplex have been prohibitive because of the requirement that separate pools of enantiopure lactide monomers must first be polymerized to enantiopure polymers before combining to make the stereocomplex.

Since lactic acid is commercially available in racemic form, it would be desirable that crystalline polymers similar in properties to the PLA stereocomplex made from enantiopure lactide monomers be prepared from a racemic mixture of lactides. This would provide a simple route to polylactide formation because it would eliminate the need for enantioselective fermentation routes for the synthesis of polylactide monomers.

Mandelides

While a broad range of physical properties is available from polymers consisting of Poly(hydroxybutyrate)s and poly(lactide), one unmet need is a glassy, degradable polymer with a high glass transition temperature (T). The backbone of polylactide is relatively flexible resulting in a $T_g$ near 60° C., but substituting an aromatic ring for the methyl group of polylactide should, by analogy to polystyrene, result in a polymer with a significantly higher $T_g$. Thus, mandelide, the dimer of mandelic acid (2-hydroxy phenylacetic acid), is a particularly intriguing monomer for ring opening polymerization.

Prior art attempts at preparing polymandelides have produced polymers with number average molecular weights less than 5,000, too low for most practical applications. No glass transition temperatures were reported for these polymers. Direct condensation of 1-bromophenyl acetic acid in the presence of triethylamine (Pinkus et al., J. Polymer Sci. Part A-Polymer Chem. 27: 4291–4296 (1989)), transesterification of methyl mandelate (Domb, J. Polymer Sci. Part A-Polymer Chem. 31: 1973–1981 (1993)), and condensation of mandelic acid (Whitesell et al., Chem. Maters. 2: 248–254 (1990)) all provided low molecular weight polymers with degrees of polymerization near 30. Several indirect routes to polymandelide have also been reported. In the earliest synthesis of the homopolymer of mandelic acid, the trimethyltin ester of α-bromophenyl acetic acid was pyrolyzed and the resulting viscous solid was identified as polymandelide (Okada et al., J. Organometal. Chem. 54: 149–152 (1973)). Deoxy-polymerization of phenylglyoxalic acid using cyclic phosphites yielded oligomers (Kobayashi et al., Polymer Bull. 3: 585–591 (1980)), and ring opening polymerization (with loss of $CO_2$) of the anhydridocarboxylate of mandelic acid gave polymandelide with degrees of polymerization as high as 30(Smith et al., Macromol. Chem.-Phys. Makromol. Chem. 182: 313–324 (1981)). The latter method proceeds at room temperature and is claimed to proceed with retention of configuration, although crystalline polymers were not formed.

A series of articles reported the preparation and degradability of low molecular weight mandelic acid copolymers ($M_n$ less than 2,000) by the direct condensation of L-lactic acid and D,L-mandelic acid (Imasaka et al., Macromol. Chem.-Phys. Makromol. Chem. 191: 2077–2082 (1990); Imasaka et al., Intl. J. Pharma. 81: 31–38 (1992); Fukuzaki et al., Euro. Polymer J. 26: 1273–1277 (1990); Fukuzaki et al., Macromol. Chem.-Phys. Makromol. Chem. 190: 2407–2415 (1989)). These copolymers covered the entire computational range from 0–100% mandelic acid and were evaluated as potential drug carriers. Lactic acid based poly (ester-urethane)s have been reported that contain up to 20 mole % D,L-mandelic acid in low molecular weight poly (lactic acid) segments (Kylma et al., J. Appl. Polymer Sci. 63: 1865–1872 (1997)). Increasing the mandelic acid content of these polymers led to an increase in the $T_g$ of the lactide segment.

Therefore, there is a need for a process for preparing high molecular weight polymandelide, a polymer that would share many of the physical properties of polystyrene, but with the added feature of being biodegradable.

Patent references relevant to the present invention are U.S. Pat. No. 5,235,031 to Drysdale et al.; U.S. Pat. No. 5,225,129 to van den Berg; U.S. Pat. No. 5,076,983 to Loomis et al.; U.S. Pat. No. 5,053,522 to Muller; U.S. Pat. No. 5,053,485 to Nieuwenhuis et al.; U.S. Pat. No. 3,960, 152 to Augurt et al.; U.S. Pat. No. 4,057,537 to Sinclair; U.S. Pat. No. 5,028,667 to McLain et al.; U.S. Pat. No. 5,359,027 to Perego et al.; U.S. Pat. No. 5,801,223 to Lipinsky et al.; U.S. Pat. No. 5,196,551 to Bhatia et al.; U.S. Pat. No. 5,274,127 to Sinclair et al.; U.S. Pat. No. 5,332,839 to Benecke et al.; and U.S. Pat. No. 5,319,107 to Benecke et al.

SUMMARY OF THE INVENTION

The present invention provides a process for the direct synthesis of high melting polymers made from dimeric cyclic esters. In particular, the present invention provides a process for synthesis of polylactic acid (PLA) from racemic materials such as racemic lactide and synthesis of polymandelides from mandelides. The process further provides racemic metal organic ligand catalysts such as racemic salbinap that catalyzes the polymerization of racemic dimeric cyclic ester monomers to a polylactide stereocomplex.

Thus, the present invention provides a process for the preparation of a crystalline polymer of a dimeric cyclic ester which comprises providing an anhydrous dimeric cyclic ester of the formula

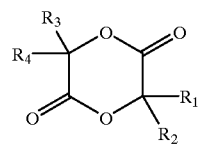

wherein $R_1$ and $R_3$ are selected from the group consisting of linear, branched and unsaturated alkyl containing 1 to 24 carbon atoms, aryl, and aromatic, and $R_2$ and $R_4$ are selected from the group consisting of hydrogen and methyl; mixing an anhydrous metal organic ligand catalyst with the anhydrous dimeric cyclic ester under anhydrous conditions to provide a reaction mixture; heating the reaction mixture to polymerize the dimeric cyclic ester to form the polymer in the reaction mixture (preferably the mixture is heated to a temperature between about 20° C. and 200° C.; and removing the polymer from the reaction mixture, wherein the steps (a) to (d) are conducted in the presence of less than 2 mole percent water based upon the ester.

In the process, the catalyst preferably comprises a racemic salbinap and the metal is selected from the group consisting of Y, Sc lanthanide elements, Group 14, transition elements, and Group 13 elements except thalium elements. In particular, it is preferable that the catalyst is rac-(salbinap) MOAlk wherein M is the metal and Alk is a lower alkyl containing 1 to 6 carbon atoms. Preferably, the catalyst is selected from the group consisting of rac-(salbinap)AlEt wherein Et is ethyl and rac-(salbinap)AlO$^i$Pr wherein $^i$Pr is isopropyl. In a preferred embodiment, the cyclic ester is an R,S cyclic ester. Further, the polymer produced by the above method has a Polymer Dispersity Index (PDI) of between about 1 and 2.0. Thus, the process produces a poly(dimeric cyclic ester) having a PDI of between about 1 and 2.0.

Further, the present invention provides a process for the preparation of a crystalline polylactic acid (PLA) which includes poly(L-lactide) and poly (D-lactide) polymer chains which comprises reacting a racemic mixture of a lactide with a metal organic ligand catalyst which is racemic so that the crystalline PLA is produced. Preferably, the organic ligand is a racemic salbinap and wherein the metal is selected from the group consisting of Y, Sc lanthanide elements, Group 14, transition elements, and Group 13 elements except thalium. In a preferred process, the lactide has the formula

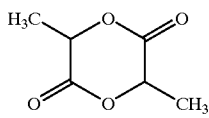

or the formula

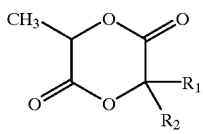

wherein $R_1$ and $R_3$ are selected from the group consisting of linear, branched, and unsaturated alkyl containing 1 to 24 carbon atoms and aryl, and hydrogen.

In one embodiment, the catalyst is rac-(salbinap)MOAlk wherein M is the metal and Alk is a lower alkyl containing 1 to 6 carbon atoms. In another embodiment, the catalyst is rac-(salbinap)AlEt wherein Et is ethyl. In an embodiment further still, the catalyst is rac-(salbinap)AlO$^i$Pr wherein $^i$Pr is isopropyl.

The present invention further provides a composition comprising a crystalline polylactic acid (PLA) prepared by the above process. In a preferred embodiment, the composition is rac-(salbinap)MOAlk wherein M is the metal and Alk is a lower alkyl containing 1 to 6 carbon atoms. In another embodiment, the composition is rac-(salbinap) AlOEt wherein Et is ethyl. In an embodiment further still, the composition is rac-(salbinap)AlO$^i$Pr wherein $^i$Pr is isopropyl.

Further, the present invention provides a process for the preparation of a polymandelide which comprises (a) providing anhydrous mandelide with a moisture content of less than about 2 mole % based on the mandelide; (b) mixing the mandelide with a metal organic ligand catalyst in an anhydrous solvent for the mandelide under anhydrous conditions to provide a reaction mixture; (c) heating the reaction mixture to polymerize the mandelide in the reaction mixture to form the polymandelide; and (d) separating the polymandelide from the reaction mixture. Preferably, the reaction mixture is heated to between about 60° C. and 180° C. to polymerize the mandelide and the mandelide is an R, S mandelide. For solutions the temperature for polymerization is preferably 70° C. and for melt polymerization is preferably at ~150–160° C. In one embodiment, it is preferable that the solvent is removed from the reaction mixture in step (b) and then reaction mixture is heated in step (c) as a melt to polymerize the mandelide. In another embodiment, a solvent is introduced into the reaction mixture in step (b) along with an initiator for the reaction and then the reaction mixture is heated in step (c) to polymerize the mandelide.

The present invention further provides a polymandelide polymer produced according to the process of above. In particular, the present invention provides a polymandelide polymer having a molecular weight distribution of between about 12,000 and 100,000 preferably 50,000 and 100,000 and a Polymer Dispersity Index (PDI) of between 1.0 and 2.0.

Polydispersity Index (PDI) is $M_w$ (weight average) divided by $M_n$ (number average molecular weight). $M_n$ is the average molecular weight per chain for a series of chains.

The term "living polymerization" means that the chain(s) grows, without being prematurely terminated, to a high molecular weight.

OBJECTS

Therefore, it is an object of the present invention to provide a process and catalysts for the production of polymers from a racemic mixture of dimeric cyclic ester precursors.

Further, it is an object of the present invention to remove the requirement of first preparing enantiopure monomers before preparing the crystalline materials.

Further, it an object of the present invention to provide polylactide and polymandelide polymers and their derivatives and processes for the preparation thereof which is relatively simple and very economic.

A particular object of the present invention is to provide a racemic catalyst for preparing crystalline polylactide from a racemic mixture of D- and L-lactide.

The present invention also provides a process for preparing polymandelide from mandelide.

These and other objects will become increasingly apparent by reference to the following description and drawings.

DESCRIPTION OF THE DRAWINGS

FIG. 23A is poly (ethylmethylglycolide), FIG. 23B is poly (trimethylglycolide) and FIG. 23C is poly (methylphenylglycolide).

FIGS. 30A, 30B and 30C are graphs showing $^1$H NMR spectra of rac, 85% S and 15% rac, and S poly (Isopropylglycolide).

DESCRIPTION OF PREFERRED EMBODIMENTS

Figure 1A:
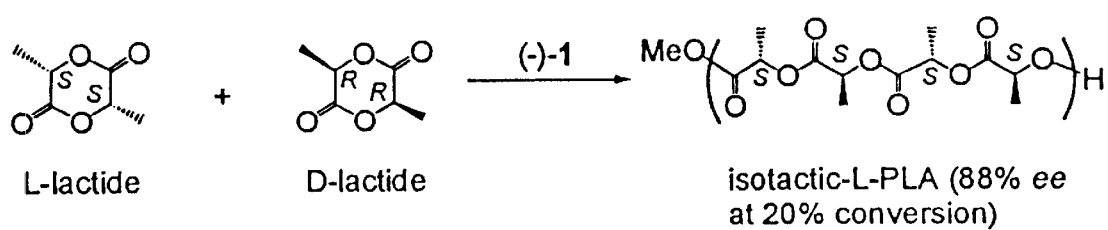
FIG. 1A shows the prior art for the Spassky et al. scheme for forming isotactic-L-PLA (88% ee at 20% conversion) from L-lactide and D-lactide using achiral Schiff's base complex of aluminum, (–)-1.

Polymer synthesis via ring-opening polymerization (ROP) is central to the preparation of biodegradable polymers from biorenewable sources. The present invention combines catalyst design with dimeric cyclic ester monomers to give novel degradable materials with a range of properties that is broader than can be obtained from conventional dimeric cyclic ester monomers. In particular, the present invention targets two species of materials, poly dimeric cyclic esters and stereocomplexes derived from mixtures of poly (D-dimeric cyclic esters) and poly (L-dimeric esters).

Dimeric cyclic esters are derived from two α-hydroxy acid molecules which are dehydrated to give a six-membered ring with two ester linkages. Examples of α-hydroxy acids are lactic acid and glycolic acid. A dimeric cyclic ester derived from two molecules of lactic acid is referred to as a lactide, when the dimer is derived from two glycolic acid molecules, the dimer is referred to as a glycolide, and when the dimer is derived from glycolides with an aromatic ring directly attached to the lactide ring, the dimer is referred to as a mandelide. The dimeric cyclic ester herein refers to a substituted $R_1$, $R_2$, $R_3$, and $R_4$ compound of the formula

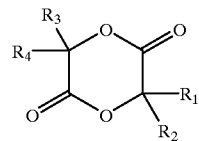

wherein $R_1$, $R_2$, $R_3$, and $R_4$ can be any non-functional group such as alkyl, aryl or aromatic. Preferably, $R_1$, $R_2$, $R_3$, and $R_4$ are selected from the group consisting of linear, branched, and unsaturated alkyl chains containing 1 to 24 carbon atoms, aryl and aromatic groups, and hydrogen. More preferably, R1 and R3 are selected from the group consisting of linear, branched, and unsaturated alkyl chains consisting of 1 to 24 carbon atoms, aromatic, and aryl, and $R_2$ and $R_4$ are selected from the group consisting of hydrogen and methyl.

When $R_1$ or $R_2$ and $R_3$ or $R_4$ are methyl groups and the remaining R groups are hydrogen atoms, the dimeric cyclic ester is a lactide which has the formula

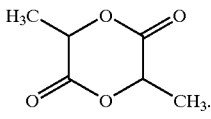

Substituted lactides are lactides wherein the hydrogen atoms of ring carbons 2 and 5 are replaced with a group selected from linear, branched, and unsaturated alkyl containing 1 to 24 carbon atoms and aryl. Any one of the substituted lactides is a suitable substrate for the polymerization process of the present invention.

A preferred substituted lactide is a dimeric cyclic ester as shown above wherein $R_3$ and $R_4$ are methyl and hydrogen, respectively, and $R_1$ is selected from the group consisting of linear, branched, and unsaturated alkyl containing 1 to 24 carbon atoms and aryl, and $R_2$ is selected from the group consisting of hydrogen and methyl. The formula for the substituted lactide is

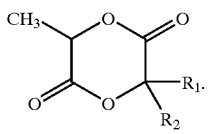

When $R_1$, $R_2$, $R_3$, and $R_4$ of the dimeric cyclic ester shown previously are each hydrogen atoms, the dimeric cyclic ester is referred to as a glycolide. Substituted glycolides are glycolide monomers wherein at least one of the hydrogens of carbon 2 or 5 is replaced with a group selected from linear, branched, and unsaturated alkyl containing 1 to 24 carbon atoms and aryl. For example, when the $R_1$ and $R_3$ are $CH_2CH_3$ and $R_2$ and $R_4$ are hydrogen, the monomer is ethylglycolide; when $R_1$ and $R_3$ are $(CH_2)_5CH_3$ and $R_2$ and $R_4$ are hydrogen, the monomer is hexylglycolide; when $R_1$ and $R_3$ are $CH_2CH(CH_3)_2$ and $R_2$ and $R_4$ are hydrogen, the monomer is isobutylglycolide; and, when $R_1$ and $R_3$ are $C_6H_5$ and $R_2$ and $R_4$ are hydrogen, the monomer is a mandelide.

All of the above dimeric cyclic esters can be used in the process of the present invention.

Lactide Polymers

Figure 1B:
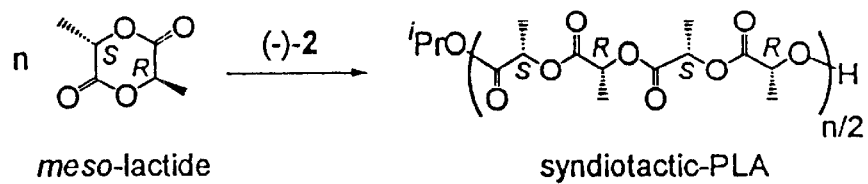
FIG. 1B shows the prior art for the Coates et al. scheme for forming syndiotactic-PLA from meso-lactide using the isopropoxide catalyst (–)-2.
Figure 1C:
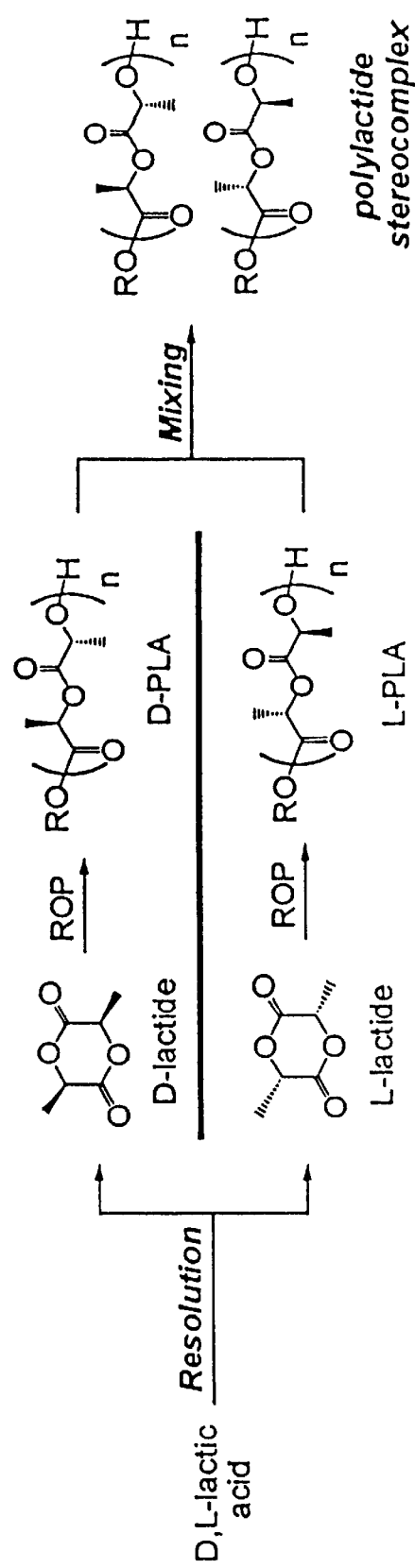
FIG. 1C shows a scheme for stereocomplex formation from a 50/50 mixture of isotactic polylactide sequences of the present invention. The $T_m$ for D- or L-PLA is 180° C. and the Tm for polylactide stereocomplex consisting of a 50/50 mixture of D- and L-PLA is 230° C.
Figure 3:
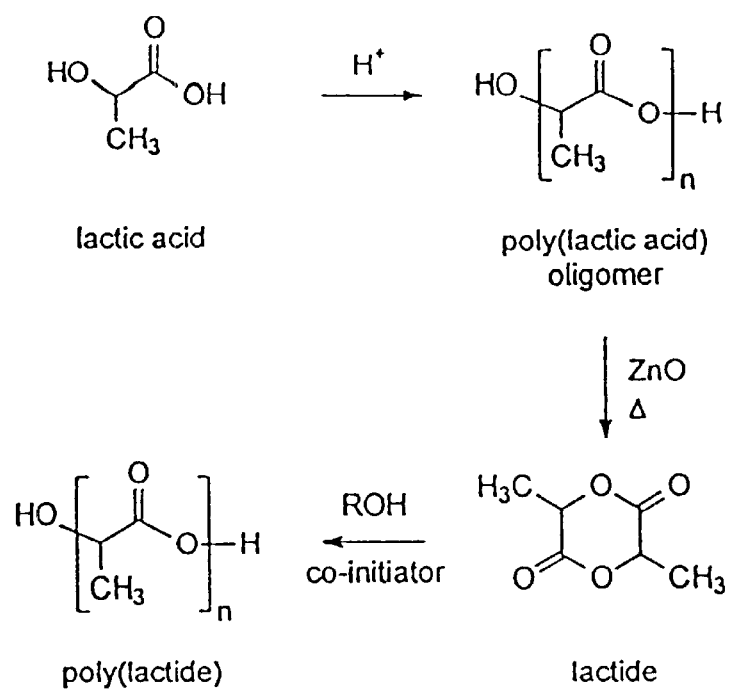
FIG. 3 shows a synthetic route to polylactide. Ring opening polymerization of the cyclic dimer of lactic acid yields high molecular weight polymer.
Figure 4:
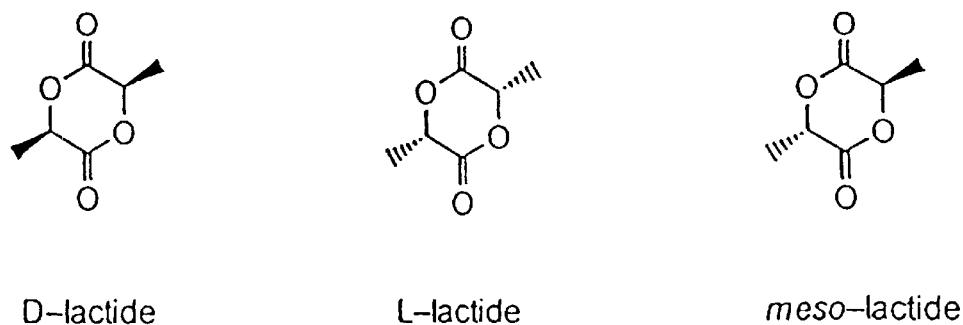
FIG. 4 shows the dilactide stereoisomers obtained from condensation of a mixture of D- and L-lactic acid.

While the present invention provides a process for the polymerization of dimeric cyclic ester monomers by the ring-opening polymerization (ROP) of dimeric cyclic ester monomers, a preferred embodiment of the present invention is a process for the synthesis of polylactides and substituted polylactides which are polymers prepared by ROP of lactide monomers (FIG. 4) and substituted lactide monomers. FIG. 3 shows polylactides prepared by ROP of lactide, the dimer of lactic acid. There are three types or enantiomers of lactide monomers: D-lactide, L-lactide, and meso-lactide (FIG. 4). These monomers can be polymerized individually or as mixtures. When a single lactide enantiomer is polymerized, it results in formation of a stereoregular isotactic polymer, also referred to as a homochiral polymer, which is highly crystalline (FIGS. 1A and 1B). Because the mechanical properties of these crystalline polymers are stable to near the melting point of the polymer, these stereoregular polymers have higher use temperatures. When the D- and L-lactides are separately polymerized, and then mixed, the result is a stereocomplex that has a higher melting temperature than that for the homochiral polymers (FIG. 1C).

Figure 5:
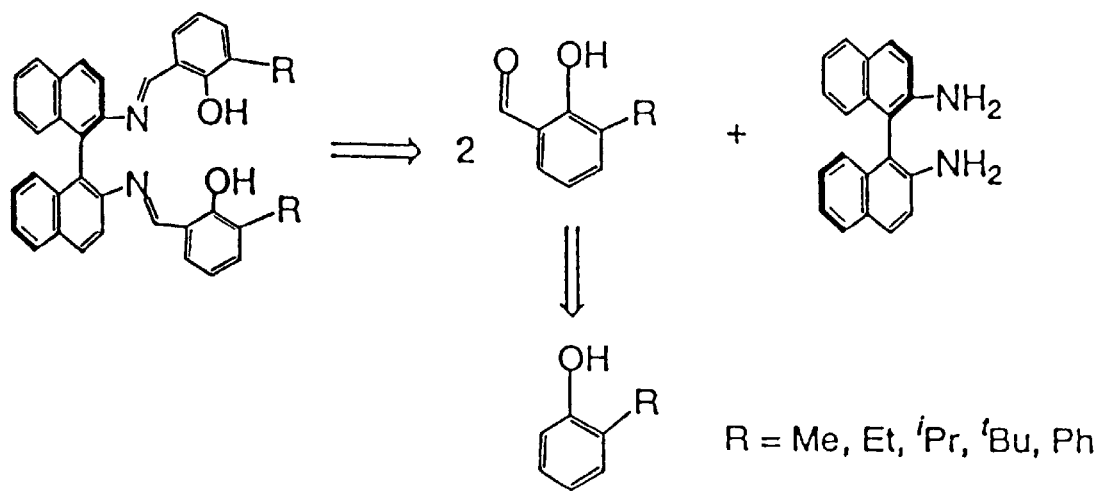
FIG. 5 shows the retrosynthesis of chiral amine derivatives from substituted salisylaldehydes and R-(+)-1,1'-biaphtyl-2,2'-diamine.

The catalyst for the above polymerizations is important. Existing enantioselective catalysts suffer from relatively low polymerization rates. Although the rates can be enhanced by running polymerizations at higher temperatures, the stereospecificity for lactide polymerizations can suffer under conditions where rates are sufficiently rapid for practical applications. There are two basic strategies for improving rates while maintaining desired specificity. These include incorporating a more active metal within the ligand framework or improving the intrinsic enantioselectivity of the ligand through synthetic modifications such that enantioselectivity remains high when elevated temperatures are required to reach useful catalytic activities, as in FIG. 2. The latter strategy is desirable and is shown in FIG. 5. The substituted salicylaldehydes are prepared from readily available phenols (Casiraghi et al., Chem. Soc.-Perkin Trans. 1: 318–321 (1978)). Ligand libraries can be synthesized through condensations of aldehydes with 1,1'-binaphtyl-2, 2'-diamine (Miyano et al., Bull. Chem. Soc. Jpn. 57: 2171–2176 (1984)). The diamine can be prepared on large scale and used in racemic or resolved forms. While $C_2$ symmetric ligands are shown in FIG. 5, synthesis of lower symmetry ligands by stepwise condensations are straightforward. When chiral ligands are desired, the conformational stability for enantiomers of 1,1'-binaphtyl -2,2'-diamine ensures that the intrinsic chirality is maintained.

Figure 6:
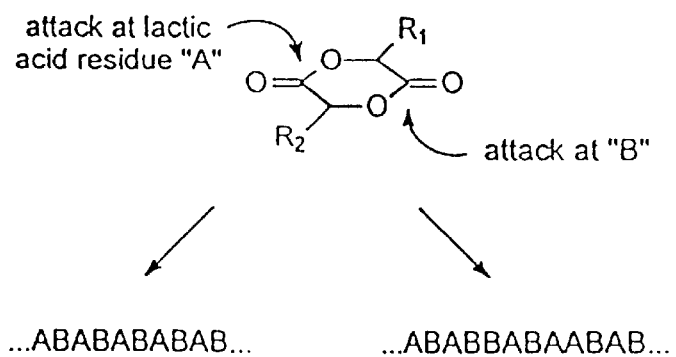
FIG. 6 shows the exclusive attack at the carbonyl of either residue A or B, which leads to perfectly alternating polymers. The use of catalysts with low selectivity results in defects in the form of head-to-head linkages.

Two kinds of monomers were developed to test the selectivity of catalysts for lactide polymerizations. As shown in FIG. 6, the first class of monomers are AB monomers, lactides that contain two different lactic acid residues. There are a variety of substitution patterns that can comprise the glycolide ring, but for simplicity and to avoid side reactions, the initial focus is on simple alkyl and aryl substitutions that can be used to tune steric demands of each lactic acid residue. Upon initiation of polymerization of a "mixed" lactide and during propagation, there are two possible sites for attack on the glycolide ring structure, and the expectation is that ring opening proceeds preferentially by attack at the least hindered carbonyl. As steric requirements of a lactic acid residue increase, the selectivity of the ring opening process will also increase and the polymer begins to take on a regular ABAB pattern. Thus the selectivity of the catalysts can be evaluated by measuring the regularity in the alternating AB polymer. Generating regular alternating copolymers is important because the regular pattern favors efficient packing and high crystallinity.

Mandelides

Figure 7:
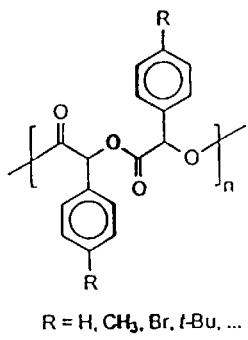
FIG. 7 shows substituted polymandelides.

The second class of monomers includes derivatives of mandelic acid. Hundreds of derivatives of mandelic acid are known, and many of these are compatible with ROP. Substituents can be selected that impart specific physical characteristics in the final polymer, and if placed at the 4-position of the mandelide ring, they in general will have a small effect on mandelide polymerizability. FIG. 7 shows substituted polymandelides. Based on the structure property relationships in polystyrenes, halogenation of the ring can lead to increased solvent resistance and flame retardancy, as well as an increase in the glass transition ($T_g$). Adding t-butyl or other large alkyl groups at the 4-position also can increase $T_g$ and favor formation of a glassy material.

The following illustrates the preparation of polylactides and polymandelides according to the process of the present invention.

Preparation of Polylactides

In the prior art, poly(L-lactide) and poly(D-lactide) form a 1:1 stereocomplex with a melting point ($T_m$) that is 50° C. higher than that for either pure poly(D-lactide) or poly(L-lactide). However, despite the improved mechanical properties of the stereocomplex, practical applications of the stereocomplex have been limited by the need for enantiopure lactide monomers and polymers as precursors. The process of the present invention absolves this limitation by enabling the direct preparation of the stereocomplex from a racemic mixture of lactide.

Thus, according to a preferred process of the present invention, semi-crystalline polylactic acid (PLA) is produced in a ring-opening polymerization (ROP) process wherein racemic-lactide (rac-lactide), which is a mixture of the D and L enantiomers of lactide, is polymerized in the presence of a racemic catalyst which is a racemic mixture of a chiral aluminum complex (herein referred to as "rac-2") to produce the polymer. The rac-2 catalyst consists of a racemic mixture of the (+) and (−) forms of the catalyst shown in FIG. 2 wherein the R is isopropoxide. The polymerization reaction is performed in a non-protic solvent and at a temperature up to the boiling point of the solvent. Preferably, the solvent is toluene and the temperature is about 70° C. In the preferred reaction, the molar ratio of rac-lactide or L-lactide to catalyst is about 100 to 1. The polymerization reaction is allowed to proceed for at least 35 hours, preferably 48 hours. Afterwards, the solvent is removed in vacuo and the resulting polymer is dissolved in a minimal amount of $CH_2Cl_2$ preferably to yield a 10 wt % solution. Afterwards, the polymer is filtered, precipitated in cold methanol, and dried. Other methods for isolating the polymer include evaporation of the solvent and use of the polymer directly, or direct isolation from a melt (no solvent) polymerization.

Figure 8:
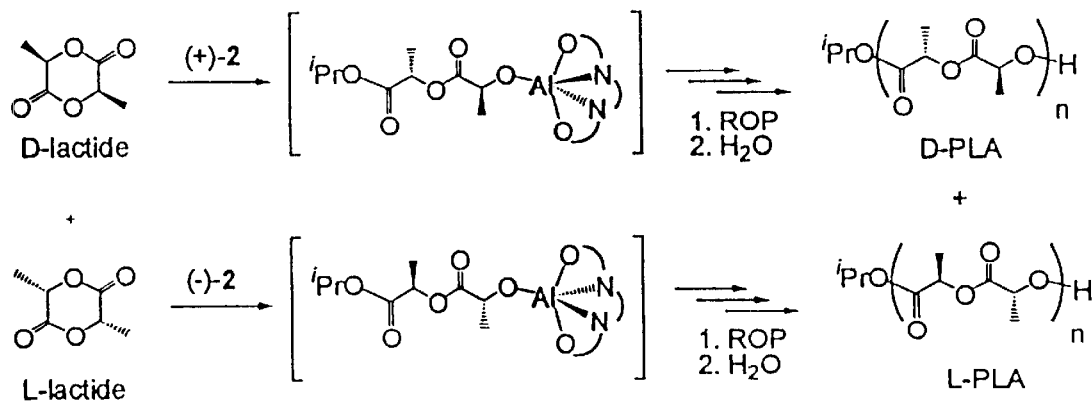
FIG. 8 shows a scheme for preparing a polylactide stereocomplex from rac-lactide using the racemic catalyst rac-2.

The scheme in FIG. 8 illustrates the process of the present invention for producing lactide stereocomplexes from rac-lactide using a racemic catalyst such as rac-2. In the reaction, D-lactide is polymerized to D-PLA by the (+) form of rac-2, and L-lactide is polymerized to L-PLA by the (−) form of rac-2. These polymerization reactions occur simultaneously and use equivalent amounts of substrate. Furthermore, the L-PLA and D-PLA form the stereocomplex as the reaction progresses. Therefore, unlike the prior art processes, the present invention does not require the prior resolution of the lactide enantiomers before the polymerization. While the lactide shown in FIG. 8 is a cyclized dimer of lactic acid, the present invention further includes substrates that are substituted lactides that are cyclized dimers of substituted lactic acid. Furthermore, the present invention further includes other dimeric cyclic ester substrates made from α-hydroxy acids such as substituted glycolides. Thus, the present invention embraces a process for the preparation of polymers from any type of dimeric cyclic ester.

In a typical reaction of the present invention using either rac-lactide or L-lactide and the rac-2 catalyst, the racemic-PLA (rac-PLA) stereocomplex so produced had a polydispersity index (PDI) of 1.05 which is consistent with a "living" polymerization process; and had an $^1H$ NMR spectrum that indicated a high degree of isotacticity in the rac-PLA. Also, differential scanning calorimetry (DSC) indicated similar $T_g$ values for the rac-PLA and L-PLA prepared as above from ROP's catalyzed by rac-2. But, there were deviations in $T_m$ between the rac-PLA and L-PLA, 191° C. vs. 170° C., respectively, and crystallization temperatures of 101° C. vs. 91° C. for rac-PLA and L-PLA prepared by ROP of the corresponding lactide monomers with rac-2.

The rac-PLA prepared from rac-lactide and rac-2 had a high degree of crystallinity, about 42%, which was comparable to L-PLA when prepared from L-lactide under identical conditions, a crystallinity of about 65%. Analysis of the powder X-ray diffraction pattern of the crystalline rac-PLA made according to the present invention indicated stereocomplexation between the isotactic domains of D-PLA and L-PLA in the racemic polymer. In contrast, as shown in the prior art, rac-PLA prepared using achiral catalysts is amorphous. These results show that the present invention provides a catalyst and a process for the direct formation of a polylactic acid stereocomplex by a simple route to polylactides with higher melting points and higher use temperatures.

Figure 2:
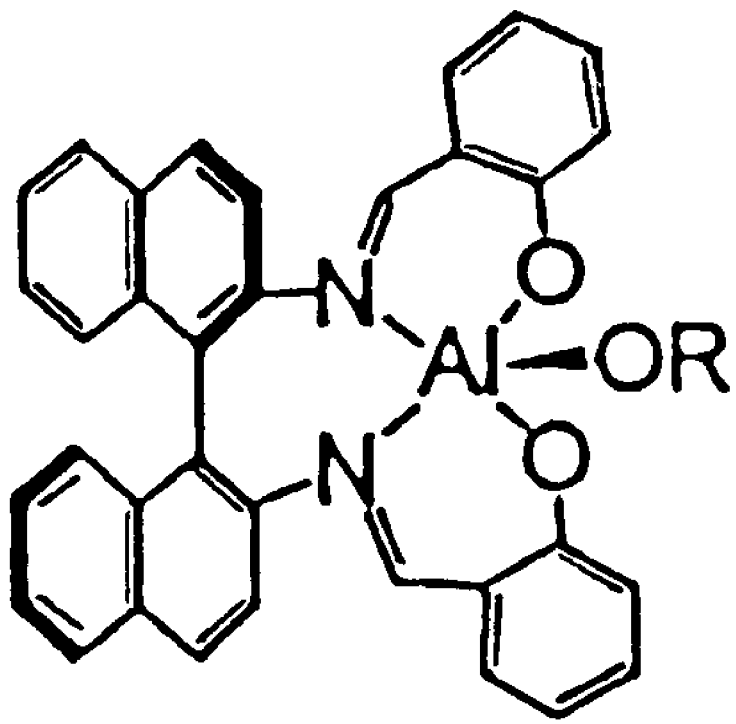
FIG. 2 shows the structure of chiral Schiff's base complex of aluminum catalysts (–)-1 and (–)-2 wherein R is either methyl (Me) or isopropoxide ($^i$Pr).

Therefore, as shown in FIG. 8, the present invention allows the direct preparation of the stereocomplex from rac-lactide. Key to the process of the present invention is the racemic metal organic ligand catalyst, rac-2, which is comprised of chiral metal organic ligand catalysts (+)-2 and (−)-2. The structure of rac-2 is shown in FIG. 2, which shows salbinap wherein R is isopropyl; however, the R constituent is not limited to isopropyl but can include other organic groups, such as alkyl containing 1 to 6 carbon atoms. An example of a suitable alkyl is ethyl. Further, whereas FIG. 2 shows the metal aluminum in the catalyst, other metals can be used. Thus, the metal can be any metal selected from the group consisting of Y, Sc lanthanide elements, Group 14, transition elements, and Group 13 elements except thalium. The rac-2 catalyst enables the parallel and contemporaneous synthesis of isotactic D-PLA and L-PLA domains because (+)-2 preferentially polymerizes D-lactide and (−)-2 preferentially polymerizes L-lactide. The D:L ratio in the monomer pool remains constant at high conversion since polymerization by the racemic catalyst removes D and L isomers at equal rates. This is in contrast to the kinetic resolution of rac-lactide using a prior art catalyst such as (−)-1 wherein high enantioselectivity is achieved at low conversion but wherein the D and L isomers are polymerized at a different rate at high conversion. Therefore, in the process of the present invention, high enantioselectivity was maintained at high conversion with rac-2 which gave a 1:1 mixture of isotactic domains.

Thus, according to the present invention, polymerization of rac-lactide with rac-2 yields nearly monodisperse chains ($M_w/M_n$ polydispersity ratio of 1.05) consistent with a "living" polymerization and the absence of transesterification. This is supported by the linear relationship between the monomer conversion to polymer and $M_n$ (Penczek et al., Chem. Rapid. Commun. 12: 77–80 (1991); Matyjaszewski, Macromols. 26: 1787–1788 (1993); Matyjaszewski et al., Div. Polymer Chem. Am. Chem. Soc. 38: 456–457 (1997)). More importantly, the $^1H$ NMR spectrum (FIG. 9A) is consistent with formation of domains that are predominantly isotactic. Two separate control experiments were performed to confirm the tacticity.

Figure 9A:
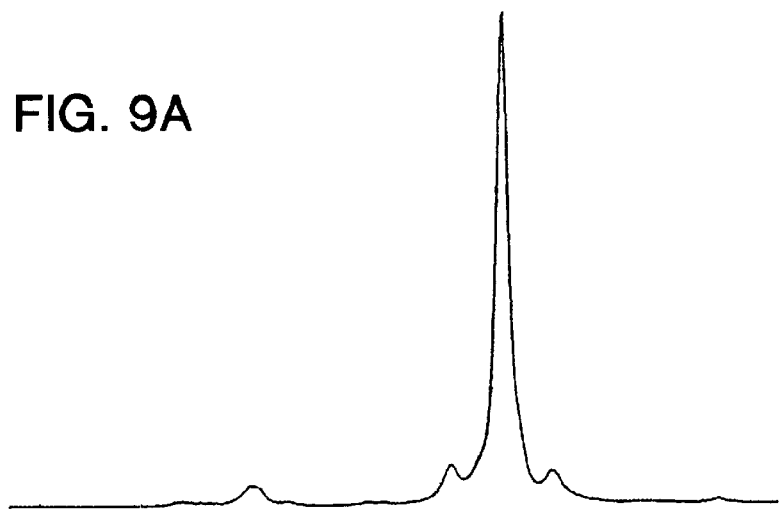
FIG. 9A shows the $^1$H NMR spectra (500 MHz in CDCl$_3$) of PLA methine resonances with selective decoupling of PLA methyl resonances of rac-PLA prepared by ROP of rac-lactide by rac-2.
Figure 9B:
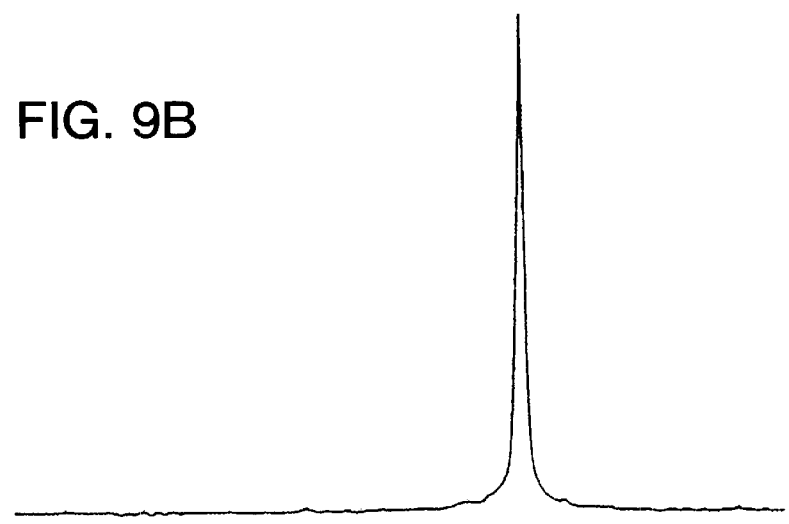
FIG. 9B shows the $^1$H NMR spectra (500 MHz in CDCl$_3$) of PLA methine resonances with selective decoupling of PLA methyl resonances of L-PLA prepared by ROP of L-lactide by rac-2.
Figure 9C:
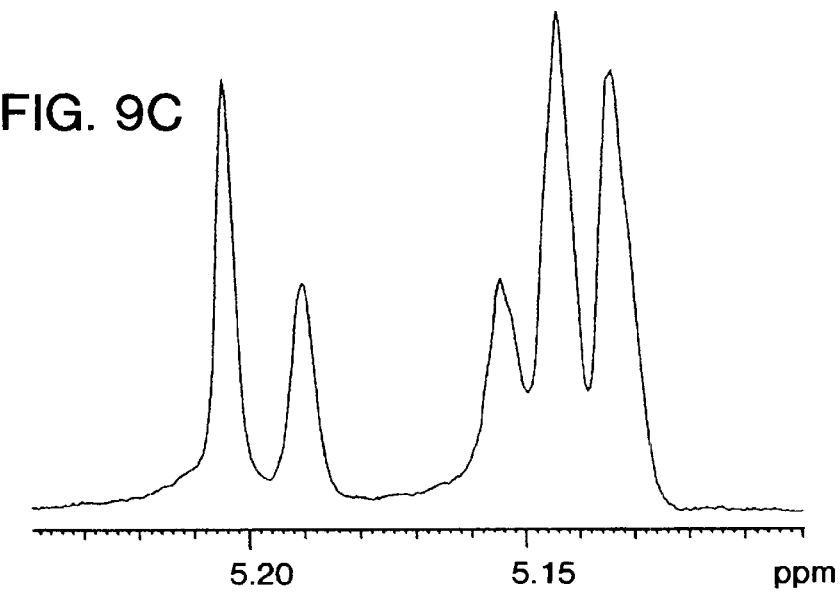
FIG. 9C shows the $^1$H NMR spectra (500 MHz in CDCl$_3$) of PLA methine resonances with selective decoupling of PLA methyl resonances of rac-PLA prepared by ROP of rac-lactide with the catalyst Sn(octanoate)$_2$.

In the first control experiment, L-lactide was polymerized with the same catalyst batch used to generate the rac-PLA. The NMR spectrum of this sample (shown in FIG. 9B) demonstrated that epimerization of the lactide monomer did not occur under the experimental conditions. In the second control experiment, rac-lactide was polymerized with an achiral catalyst. The homonuclear decoupled spectrum of the methine region, shown in FIG. 9C, is similar to that recently reported by Thakur, et al. (Chem. Commun. __:1913–1914 (1998)) where assignments for various tetrad and hexad stereochemistries have been made. As shown in FIGS. 9A and 9B, comparable spectra of rac-PLA and L-PLA are shown, respectively. Clearly, the spectrum of rac-PLA derived in the process of the present invention using rac-2 closely resembles the spectrum of L-PLA. This is significant because it confirms that predominantly isotactic domains were formed in the polymerization of rac-lactide by rac-2. The chemical shift for the methine resonance in the spectrum shown in FIG. 9B is consistent with the chemical shift for the iii tetrad shown in FIG. 9C. It is clear from the NMR data that the sample in FIG. 9A has a small percentage of iiisi hexads that are absent in the sample shown in FIG. 9B. The slight deviations in chemical shifts for the resonance for the iii tetrad between that shown here and that reported by Thakur et al. (ibid.) (δ5.14 vs. δ5.17) arise from deviations in field strength between spectrometers. Thus, the stereoselectivity in the ROP of rac-lactide by rac-2 yields polymers that have isotacticities slightly less than that of L-PLA.

Figure 10:
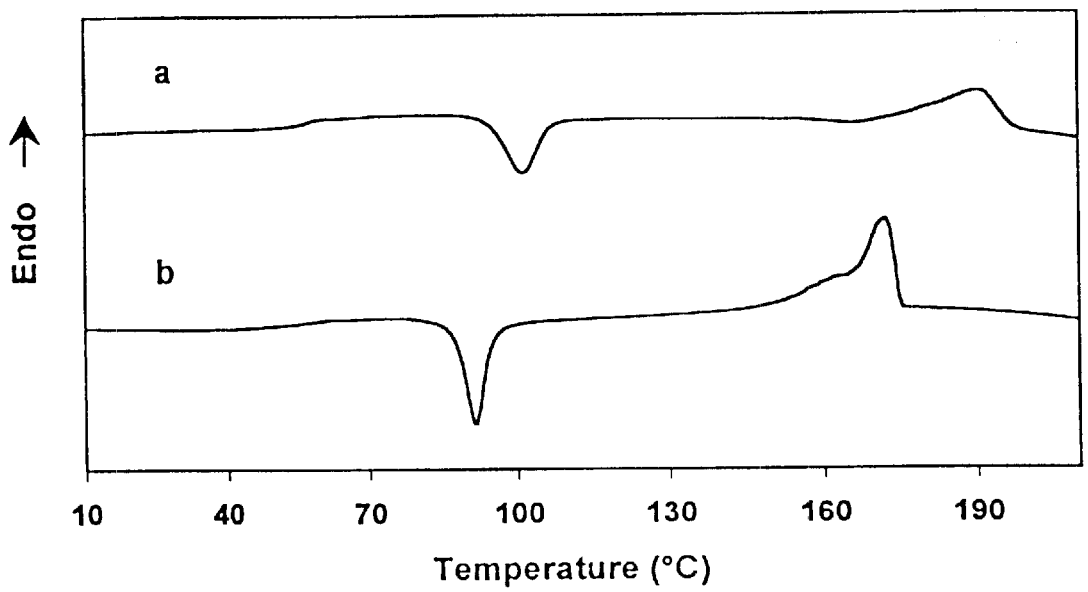
FIG. 10 shows differential scanning calorimetry (DSC) scans of PLA for polymerizations run at 70° C. A DSC scan of rac-PLA prepared by ROP of rac-lactide by rac-2 is shown by "a." A DSC scan of L-PLA prepared by ROP of L-lactide by rac-2 is shown by "b."

The polymers that correspond to the spectra in FIGS. 9A, 9B, and 9C were also characterized by differential scanning calorimetry (DSC). The results are shown in FIG. 10. For L-PLA prepared by ROP of L-lactide using rac-2, the glass, melting, and crystallization temperatures ($T_g$ of 55° C., $T_m$ of 170° C., $T_c$ of 91° C.) were comparable to samples described in the prior art. In addition, the $\Delta H_{FUS}$, which was 65 J/g, indicated the L-PLA had a degree of crystallinity of about 65% (Huang et al., Macromols. 31: 2593–2599 (1998)). However, while the rac-PLA prepared using rac-2 had a similar glass transition ($T_g$ of 550 C), the rac-PLA had significantly higher melting and crystallization temperatures ($T_m$ of 191° C., $T_c$ of 101° C.). Furthermore, the $\Delta H_{fus}$, which was 42 J/g, indicated that the rac-PLA had a significant degree of crystallinity of about 42%. In contrast, polymerization of a lactide with an achiral Schiff's base aluminum alkoxide catalyst, a $\Delta H_{fus}$ of 10 J/g was seen for the samples that were 40% enriched in a particular enantiomer. When rac-lactide was polymerized using the same catalyst, there was no evidence for crystalline domains, and the melting point of the PLA (Tm of about 150° C.) was considerably lower than for the stereocomplex. This was shown by Wisniewski et al., Macromol. Chem. Phys. 198: 1227–1238 (1997). This result shows that a racemic catalyst such as rac-2 is key in the process of the present invention for making crystalline polymers such as rac-PLA.

The results of the process of the present invention using the rac-2 catalyst were remarkable. Normally, when rac-lactide is polymerized using achiral catalysts, amorphous materials are made because of the random placement of the D- and L-lactide monomers in the individual PLA chains. Thus, small amounts of a minor enantiomer can have deleterious effects on polymer properties when enantiomer enriched monomers are polymerized with achiral catalysts. Also, polymerization of L-lactide with 70% optical purity gives PLA with no crystallinity (Sarasua et al., Macromols. 31: 3895–3905 (1998)).

Figure 11:
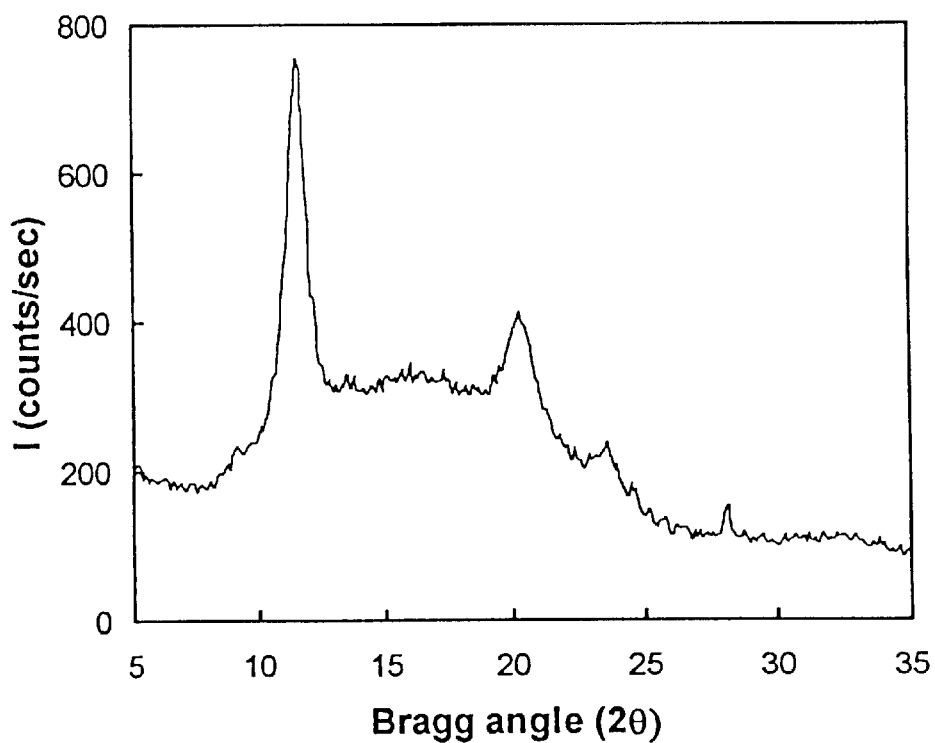
FIG. 11 shows X-ray powder diffraction data for a rac-PLA prepared from a rac-lactide mixture by rac-2.

The surprisingly high crystallinity in the rac-PLA sample can be explained by either of two models for the crystalline phase of rac-PLA; the formation of a stereocomplex, or a 1:1 mixture of crystalline domains of L-PLA and D-PLA. These two models can be easily distinguished by powder x-ray diffraction because of the large difference in the scattering profiles for the stereocomplex compared to L-PLA (Brizzolara et al., Macromols. 29: 191–197 (1996)). X-ray powder diffraction is diagnostic for the formation of the lactide stereocomplex, as well as crystalline domains of D- or L-lactide (Brizzolara et al., Macromols. 29: 191–197 (1996)). The X-ray diffraction pattern of rac-PLA shown in FIG. 11 indicates that a stereocomplex was formed by the process of the present invention because peaks which would have indicated 1:1 mixture of crystalline domains of L-PLA and D-PLA were absent. The diffraction pattern of rac-PLA corresponding to the NMR spectrum in FIG. 9A matches that of the stereocomplex, confirming that the stereocomplex was made in the polymerization reaction.

The difference between the $T_m$ for the stereocomplex prepared from rac-lactide using the rac-2 catalyst, and the $T_m$ for the stereocomplex prepared from enantiopure D- and L-PLA (Ikada et al., Macromols. 20: 904–906 (1987)) reflects a lower degree of isotacticity in the individual chains in the rac-PLA sample. When rac-lactide was polymerized in the presence of rac-2 at higher temperatures, the NMR spectra reflected a degree of isotacticity that was intermediate between that shown in FIGS. 9A and 9C. However, $T_m$ and $T_c$ were not observed for the resulting polymer. This highlights the sensitivity of $T_m$ and $T_c$ with respect to changes in tacticity. Further improvements in the polymerization scheme for rac-PLA is expected lead to higher isotacticities and melting points for stereoisomers which would be equivalent to those of stereocomplexes prepared by mixing enantiopure samples of D-PLA and L-PLA.

Preparation of AB Mixed Cyclic Ester Monomers

Figure 12:
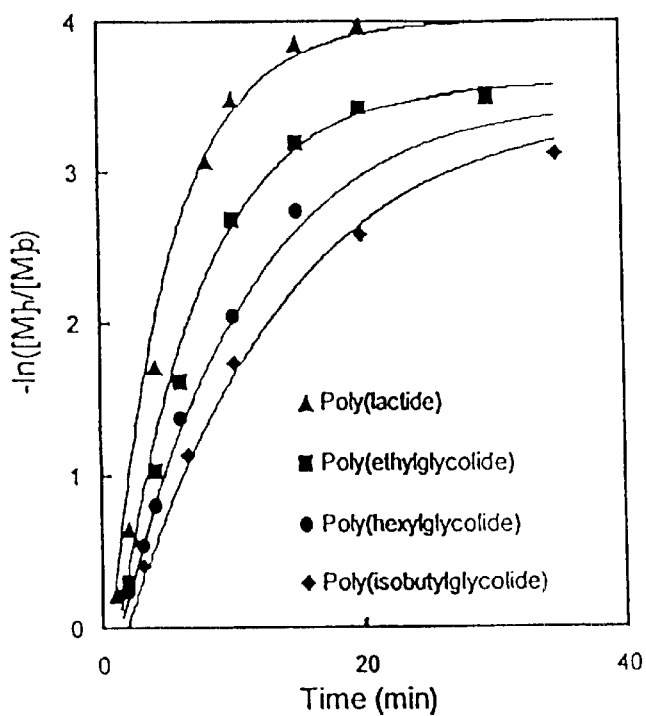
FIG. 12 shows the results of a melt polymerization of substituted glycolides. (Polymerization conditions: 130° C., [Sn(Oct)$_2$]/[t-butylbenzyl alcohol]=1.)

FIG. 12 shows the kinetic data for polymerization of AB lactide monomers. Shown is the melt polymerization of substituted glycolides under polymerization conditions of 130° C. and a ratio of $Sn(Oct)_2$ to t-butylbenzyl alcohol equal to 1. The substituted glycolides were polylactide, polyethylglycolide, polyhexlglycolide, and polyisobutylglycolide. From this series of experiments, the rate constant for polymerization ($K_p$) was obtained by fitting the data to the simple first order rate law used to describe lactide polymerization. Similar sets of data were obtained for solution and bulk polymerizations. An unexpected result was that substitution of the lactide ring greatly enhances the tendency for monomers to be inserted into the growing polymer chain with alternating stereochemistry (syndiotactic placement). This result was obtained with a non-selective catalyst (Sn (2-ethylhexanoate)$_2$), which implies that it would be relatively easy to design catalysts that provide a high stereoregularity in the polymerization of AB monomers.

Figure 13:
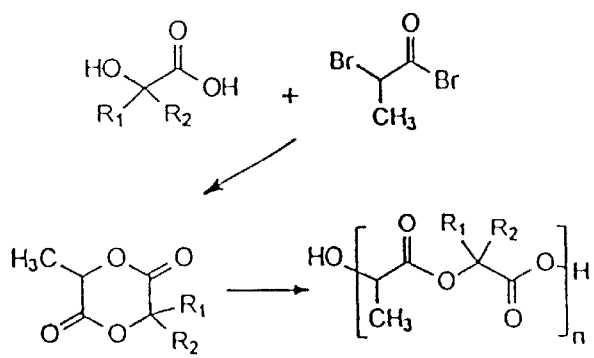
FIG. 13 shows synthetic routes to new AB lactide monomers and polymers.

FIG. 13 shows some of the new AB lactide monomers that have been made using the process shown in the FIG. 13. The route to these monomers is particularly flexible in that α-bromoacyl bromides can be combined with about any lactic acid or substituted lactic acid. This procedure typically yields statistical mixtures of diastereomers. Using this mixture, melt polymerizations were performed at a 100:1 ratio of monomer to initiator and were initiated using Sn(2-ethylhexanoate)$_2$ along with one equivalent of an alcohol co-initiator. High molecular weight polymers (greater than 50,000 grams per mole) with polydispersities from about 1.5 to 1.7 were obtained. Both the physical properties of the polymers and the regularity of the polymers are of interest.

As shown in FIG. 13, the $T_g$s of these materials fall between that of homopolymers prepared from their respective lactic acids. Thus, these monomers provide a convenient route to polylactides with a broadened range of physical properties. When mixtures of diastereomers are used, none of the polymers are expected to be crystalline. However, polymers made from single diastereomers can have crystallinity.

Figure 14:
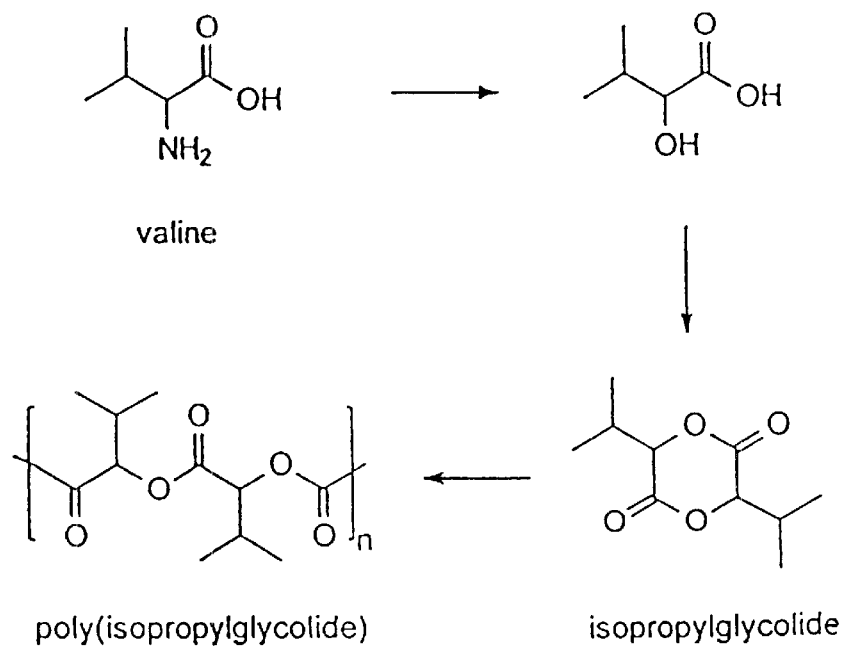
FIG. 14 shows the preparation of poly (isopropylglycolide), a high-melting polylactide.

For example, a novel substituted polylactide was prepared from a single diastereomer that had interesting properties. As shown in FIG. 14, 2-hydroxy -3-methylbutyric acid is an analog of valine and is easily obtained as a single stereoisomer from the amino acid. Simple condensation of the hydroxy acid gave D-isopropylglycolide, a substituted lactide. While the polymer derived from a racemic mixture of the D- and L-lactide was an amorphous polymer with a $T_g$ of 50° C., poly(D-isopropylglycolide) was a crystalline polymer with a $T_m$ of 230° C. This melting point extends the usuable range for polylactides by more than 30° C., making it comparable to poly(ethylene terephthalate), the polyester widely used for soft drink bottles. The polymer crystallinity can be controlled through copolymerization. For example, the polymer from a mixture of 85% D-isopropylglycolide and 15% DL-isopropylglycolide has a $T_m$ of 170° C.

Preparation of Polymandelides

Polylactides are prepared by the ring opening polymerization of lactide (Kowalski et al., Macromols. 33: 1964–1971 (2000)), the cyclic dimer of lactic acid; therefore, ring opening polymerization would seem the logical route to high molecular weight polymandelide. However, the polymerization of mandelide to high molecular weight homopolymers poses significantly more challenges. Because the aromatic rings of mandelide hinder attack at the ring carbonyls, mandelide polymerization is slow and side reactions appear to limit the molecular weight of the polymandelides that can be obtained. Preliminary experiments with R,S-mandelide yielded polymers in high conversion but with modest molecular weights, about one quarter of the expected values based on the monomer/initiator ratio. For polymandelides to be useful as a polystyrene analog, methods must be devised that consistently lead to polymandelide with molecular weights greater than 20,000 grams per mole. Therefore, catalysts that accelerate the propagation rate favor propagation of the polymer chain over competing side reactions.

Figure 15:
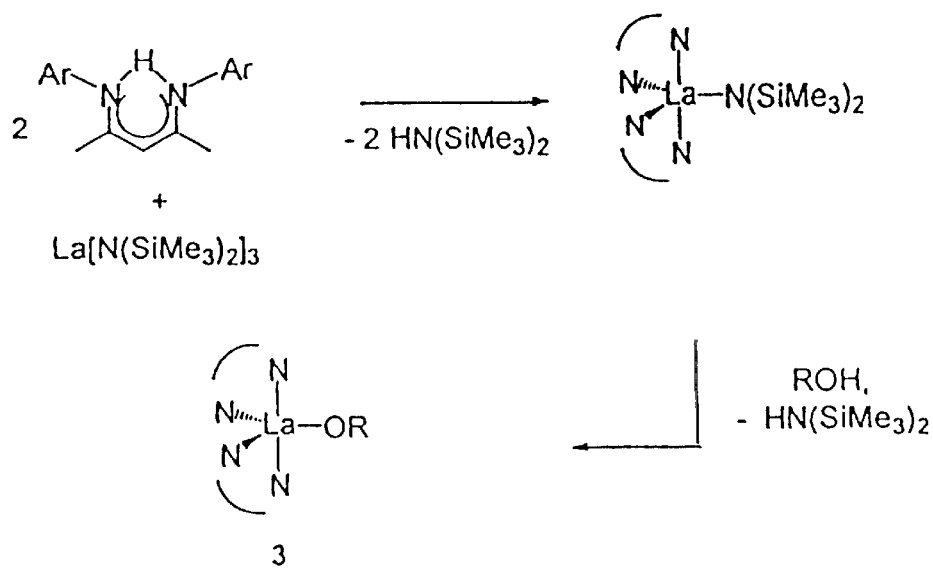
FIG. 15 shows a route to forming a lanthanide complex with a single alkoxide initiation site.

Single-site catalysts 2 such as ketimine catalysts give relatively short chains and DL-mandelide epimerizes to the less soluble chiral mandelides under mild conditions. Although complexes with single initiation sites are desirable, homoleptic lanthanide alkoxides and clusters that exhibit high activity for lactide polymerization could be useful. In most cases, the precatalysts are aggregates. In some cases, the catalytic activity of the alkoxide complex increases when the steric bulk of the coordination sphere is increased, which may reflect stabilization of an active monomer relative to the ground-state structure. In addition to complexes such as $[Y(OCH_2CH_2O^iPr)_3]_2$, lanthanide bis (diketiminate) complexes with single alkoxide initiation sites such as 3 may also be useful for polymerizing high molecular weight polymandelides. A route to synthesis of a lanthanide complex with a single alkoxide initiation site is shown in FIG. 15.

Mandelides are poorly soluble in many organic solvents, which leads to monomer concentrations that reduce solution polymerization rates. Melt polymerizations also have unfavorable characteristics. The R,R and S,S mandelides decompose on melting and only the R,S isomer, melting at 137° C., appears amenable to melt polymerization methods. A further complication is that the methine protons of the mandelide ring are particularly labile under basic conditions (Whitesell et al., J. Org. Chem. 48: 3548–3551 (1983)) because they are α to an aromatic ring, a carbonyl, and an oxygen atom. Thus, epimerization at the mandelide stereocenters is facile and the more stable R,R and R,S isomers form at the expense of the desired R,S isomer. Despite these challenges, the prospect of a glassy degradable polymer with polystyrene-like properties makes polymandelide an attractive synthetic target.

Figure 16:
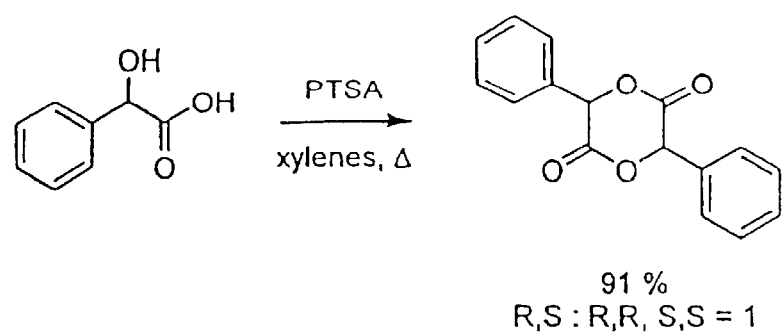
FIG. 16 shows synthesis of polymandelide via ring opening polymerization.
Figure 16:
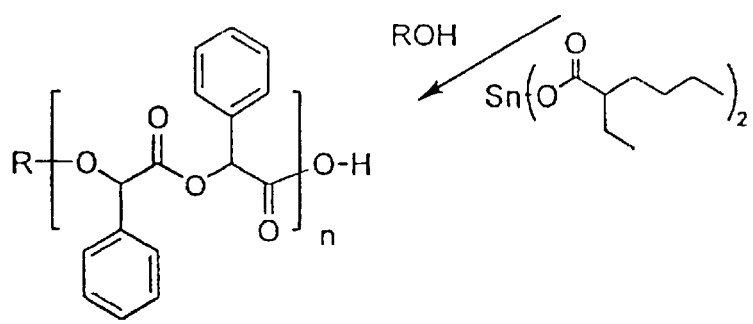

As shown in the scheme in FIG. 16, a modified literature procedure was used to prepare the R,S mandelide. The acid catalyzed dimerization of mandelic acid (Shoberl et al., Justis Liebig's Ann. Chem. 595: 101–130 (1955)) typically yields about 45% of the R,R and S,S diastereomers, which precipitate from solution. The R,S isomer (45%) can be separated from the R,R and S,S isomers by cold and rapid filtration and was purified by crystalization from ethyl acetate. Table 1 shows typical data for mandelide polymerizations. Melt polymerizations of the R,S diastereomer using $Sn(2-ethylhexanoate)_2$ as the catalyst and 4-t-butylbenzyl alcohol as the initiator resulted in conversions to polymer as high as 98% but with molecular weights about half that expected from the monomer initiator ratio used in the polymerizations. This result indicated that too many polymer chains were initiated and implied that water or a similar impurity was responsible for initiating a large fraction of the chains. Both a high molecular weight and better control over the molecular weight were desired.

TABLE 1

Melt Ring Opening Polymerization of R, S Mandelide

| Entry | [M]/[I] | Time (min) | % conv.[a] | Mn (theo.)[b] | Mn[c] | PDI |
|---|---|---|---|---|---|---|
| 1[d] | 50 | 3 | 93 | 12,500 | 6,840 | 1.17 |
| 2[d] | 50 | 3 | 86 | 11,500 | 10,400 | 1.19 |
| 3[e] | — | 60 | 73 | — | 68,300 | 1.63 |
|  |  |  |  |  | 92,300[f] | 1.48 |

[a]meaured by $^1$H NMR;
[b]corrected for conversion;
[c]measured by GPC in THF using polystyrene standards for calibration;
[d]polymerized in a sealed tube at 160° C. using 4-t-butylbenzylalcohol as initiator;
[e]polymerized in a sealed tube at 150–160° C.;
[f]Mw was determined by light scattering in THF to be 137,00 g/mol.

Attempting to remove this impurity by recrystallization was unsuccessful, however, it was discovered that by drying the monomer at 5 mTorr at 30° C. for 48 hours, polymer molecular weights that about matched those predicted for the monomer/initiator ratio (entry 2 in Table 1) were obtained. In addition, the molecular weight distributions were narrow, a characteristic of living polymerizations. Therefore, it was discovered that by drying the monomer, it was possible to prepare high molecular weight polymandelide. At a monomer to catalyst ratio of 500:1 and without 4-t-butylbenzylalcohol, mandelide polymerized more slowly (about a 70% conversion at one hour, 68,000 grams per mole) but the reaction eventually reached high conversions (entry 3 in Table 1).

The products of these polymerizations were glassy, amorphous compounds that shared many of the same properties as polystyrene. Both the polymandelides and polystyrene had similar $T_g$s and both formed clear, colorless films by casting from solution or by compression molding. The $T_g$s for polymandelide was 100° C. whereas the $T_g$S for polystyrene was 109° C. However, polymandelides and polystyrene had different solubilities. polymandelides were more polar than polystyrene and dissolved in common organic solvents such as toluene, chloroform, THF, and acetone. The calculated solubility parameter for polymandelide was 10.4 $(cal/cm^3)^{1/2}$ whereas the calculated solubility parameter for polystyrene was 9.05 $(cal/cm^3)^{1/2}$. Thermogravimetric analysis runs of polymandelide under $N_2$ showed an onset for decomposition at 320° C. and the rapid and complete weight loss above that temperature which implied depolymerization to the monomer. The results further showed that polymandelide degraded about 20 times slower than amporphous polylactide under the same conditions of pH 7.4 and 55° C., which can be attributed to polymandelide's high $T_g$ and the hydrophobic nature of the benzene ring. A structurally related polymer, polybenzylglycolide, had a $T_g$ near 50° C. and degraded at half the rate of polylactide. Thus, the higher $T_g$ of polymandelide affects the degradation rate of the polymer.

The lack of crystallinity in the polymandelides that were produced was not surprising because a stereoregular polymer is required for appreciable crystallization. A crystalline polymer derived from the R,S mandelide would need a regular RSRS or RRSS repeating pattern along the polymer backbone. Such regularity have only been obtained in solution polymerization of lactide near room temperatures using chiral catalysts (Spassky et al., Macromol. Symp. 128; 39–52 (1998); Spassky et al., Macromol. Chem. Phys. 197: 2627–2637 (1996); Cheng et al., JACS 121: 11583–11584 (1999); Ovitt et al., JACS 121: 4072–4073 (1999)), conditions where the rate of mandelide polymerization was nearly absent. NMR spectra of poly(R,S-mandelide) has multiple peaks in the methine and carbonyl regions of the $^1$H and $^{13}$C spectra, thus indicating that the polymandelide had an irregular sequence of stereocenters along the polymer backbone. These stereocenters have not been assigned; however, the large number of peaks was consistent with a high degree of stereochemical disorder. Also contributing to the irregular tacticity of the polymandelide chains was the epimerization of the monomer during polymerization. An analysis of the melt polymerization mixture at 50% conversion showed that epimerization of R,S-mandelide occurred during polymerization (epimerization was slow in the absence of the Sn(2-ethylhexanoate)$_2$ catalyst under the same conditions), and thus some number of R,R, and S,S mandelide units were incorporated into the polymer.

Figure 17:
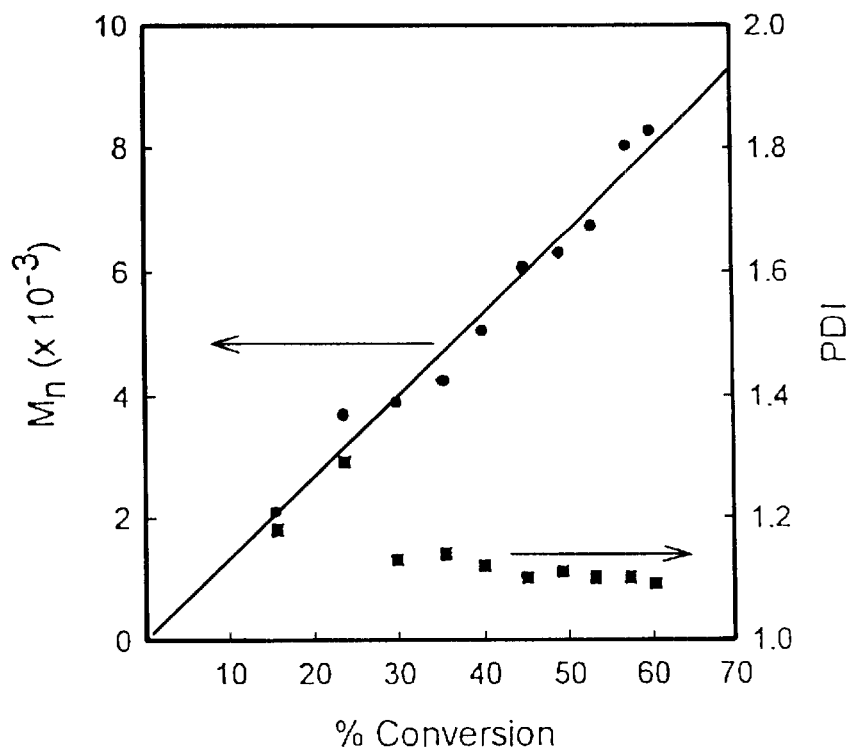
FIG. 17 shows the results of a solution polymerization of mandelide in acetonitrile at 70° C. PDI=$M_w/M_n$.

An attempt was made to minimize monomer epimerization. R,S mandelide was polymerized in acetonitrile at 70° C. The R,S mandelide was stereochemically stable in the absence of catalyst and initiator but once the catalyst and initiator were added, the monomer epimerized to a 1:1 mixture of the R,S and the R,R/S,S diastereomers, which was maintained throughout the polymerization. Polymerizations using mixtures of diastereomers behaved similarly. FIG. 17 shows the results of a typical reaction where a mixture of mandelide diastereomers (R,S: R,R/S,S=3.1) was polymerized at 70° C. using Sn(2-ethylhexanoate)$_2$ as the catalyst and 4-t-butylbenzylalcohol as the initiator. During the first hour of polymerization, less than 20% conversion had been achieved but an equilibrium mixture of the R,S and R,R/S,S mandelides of 1:1 was established. As the concentration of the poorly soluble R,R/S,S mandelides increased, a portion of the R,R/S,S diastereomers precipitated from the polymerization and the polymerization mixture remained heterogenous until the conversion reached 60%.

Figure 18:
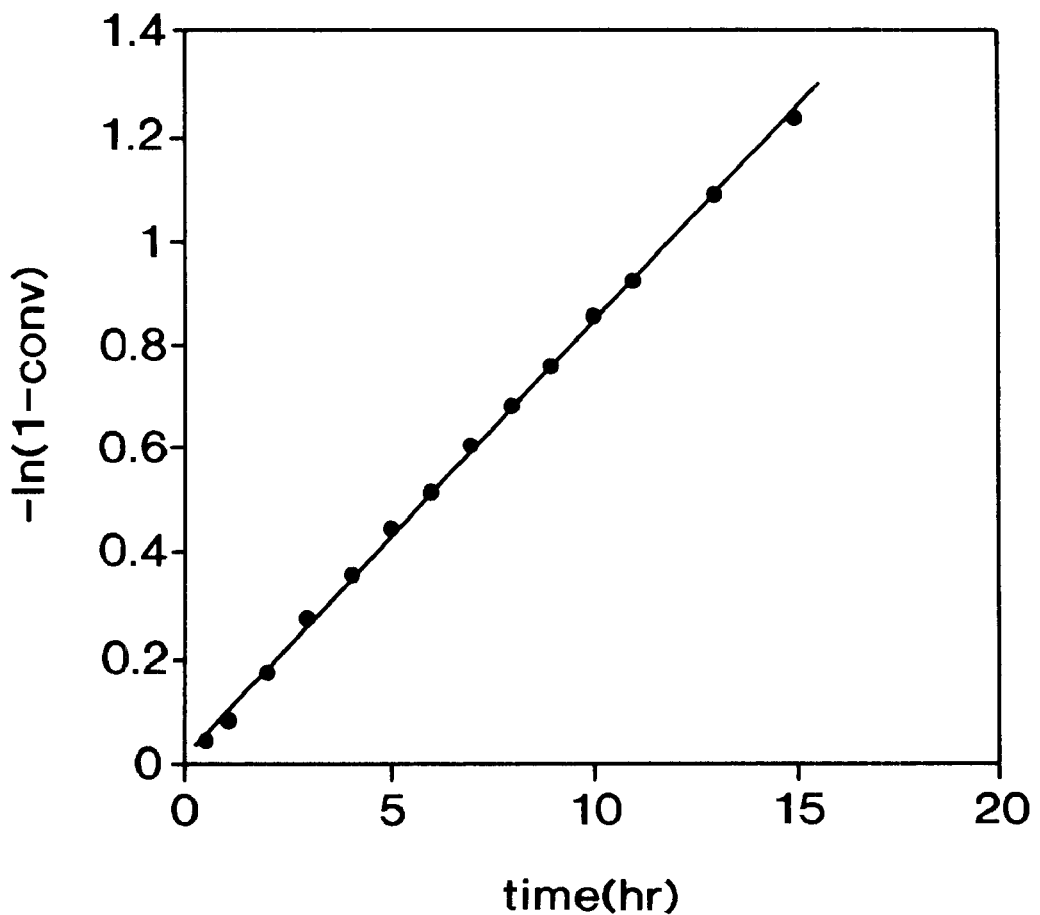
FIG. 18 shows kinetic data for the polymerization of mandelide in acetonitrile at 70° C.
Figure 19A:
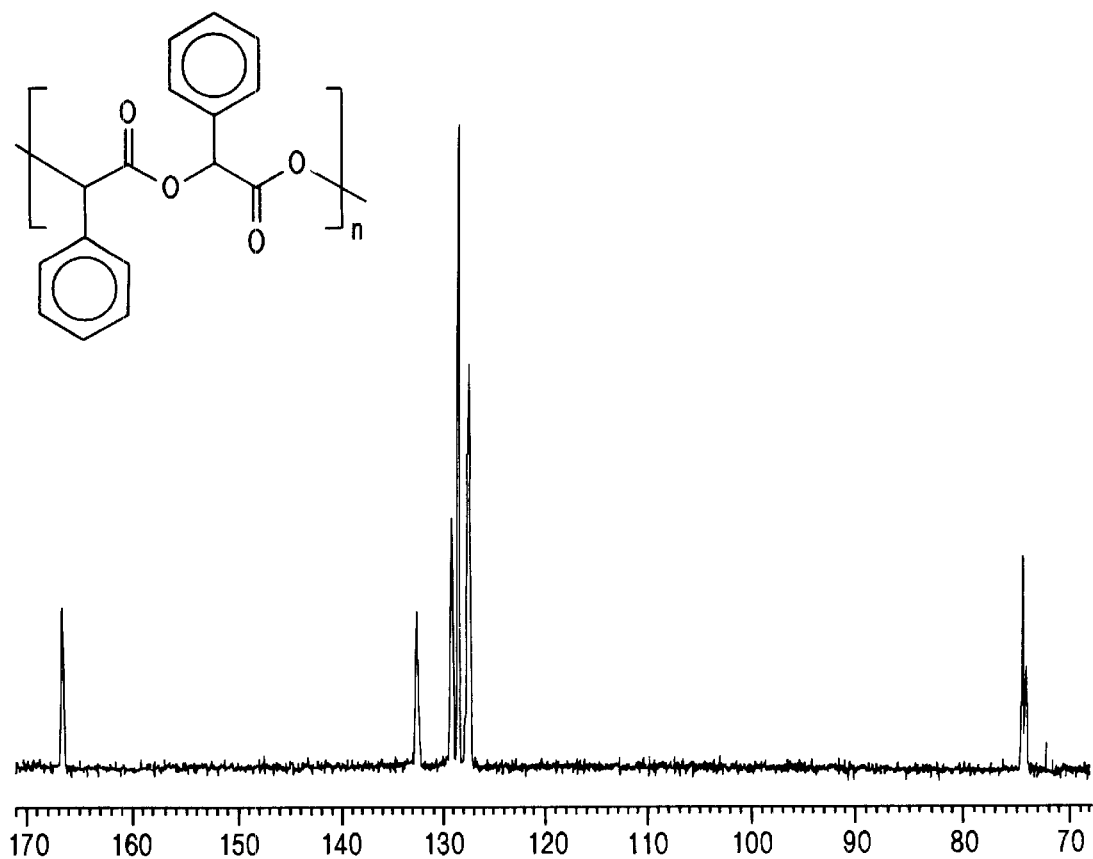
FIG. 19A shows the $^{13}$C spectra for polymandelide.
Figure 19B:
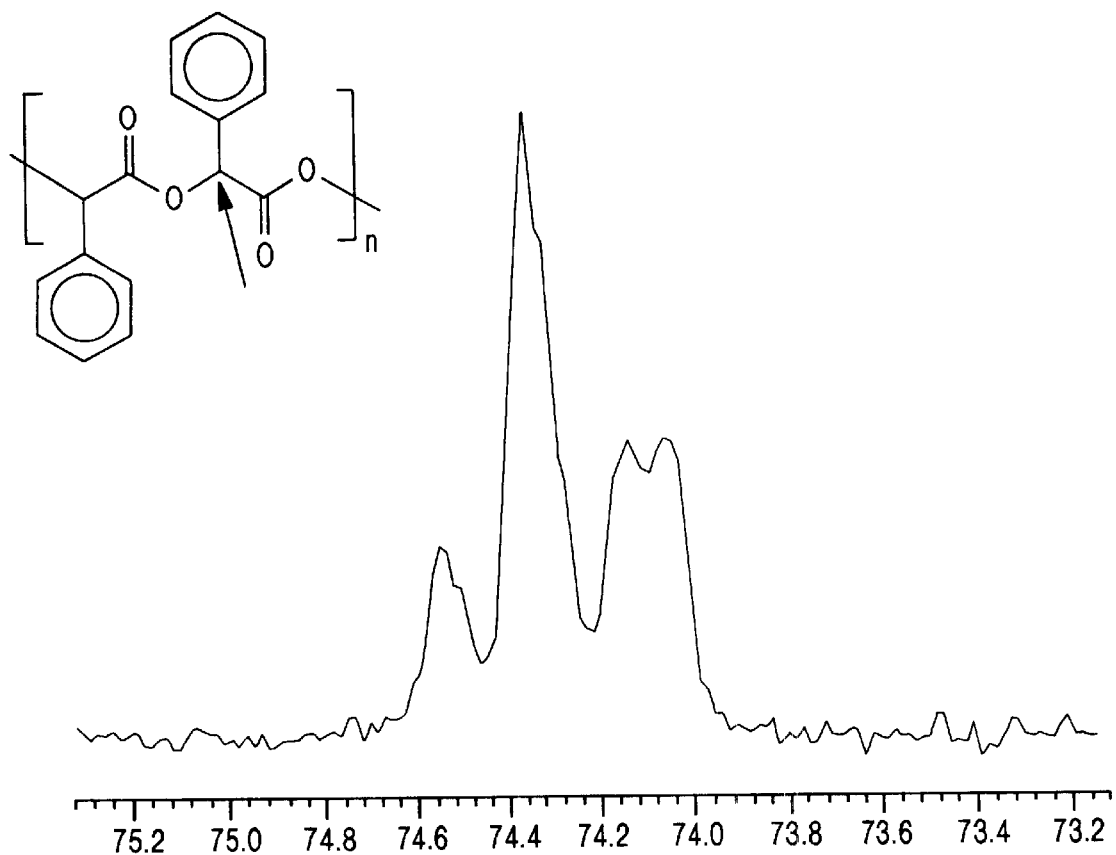
FIG. 19B shows the $^{13}$C spectra identifying the methine groups of polymandelide.
Figure 19C:
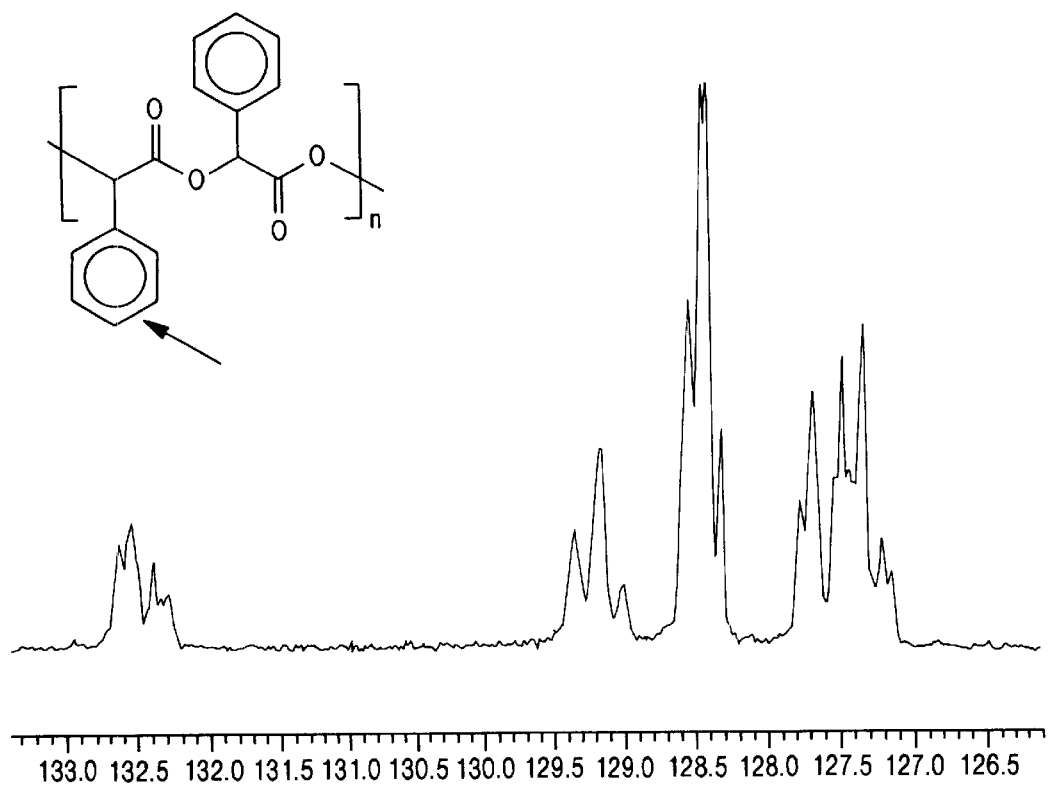
FIG. 19C shows the $^{13}$C spectra identifying the phenyl groups of polymandelide.
Figure 19D:
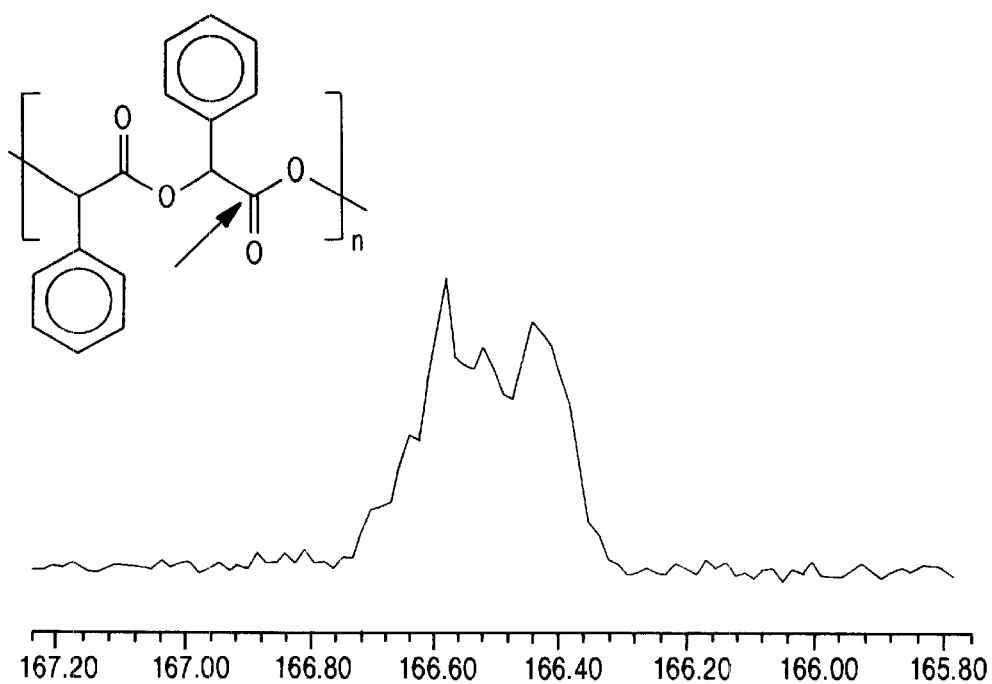
FIG. 19D shows the $^{13}$C spectra identifying the carbonyl groups of polymandelide.

Despite the potential complications caused by epimerization, the data shown in FIG. 18 showed the reaction proceeded with first order kinetics. The apparent rate constant calculated from the data, $K_p$=9.6 liter per mole-hour is about one quarter that of lactide (Yin et al., Macromols. 32: 7711–7718 (1999)). In addition, the number average molecular weight is linearly dependent on conversion with polydispersities near 1.1. The results showed that while mandelide polymerizations do not allow for control over the stereochemistry, they are "living" in character just like other substituted glycolide polymerizations. The aforementioned behavior opens the possibilities for the preparation of more complicated architectures from mandelides, such as block copolymers, which will extend the parallels between polymandelide and polystyrene.

Thus, the present invention provides a bulk process and a solution process for synthesizing polymandelides. For either process, the mandelide is dried under reduced pressure before use. In general, the mandelide is dried overnight at about 5 mTorr at about 30° C.

In the bulk process, an anhydrous mandelide with a moisture content of less than about 2 mole % based upon the mandelide monomer, is mixed with a metal organic ligand catalyst in an anhydrous solvent. The mole ratio of mandelide to catalyst is between about 50 to 1000 to 1, preferably the mole ratio is >50:1 to 250 to 1. By catalyst we are referring to the organometallic part. Then, the solvent is removed under vacuum. The mixture is then maintained within a temperature range of between about 20° C. and 200° C. Preferably, the reaction time is 1 hour and the temperature is 150° C. to 170° C. to speed up the reaction for 30 to 80 minutes. Afterwards, the polymer is purified by precipitation in cold methanol. Polymer yields are usually about 90% or more. Optionally, the reaction contains an initiator such as an alcohol, which is added to the reaction after the catalyst has been added. In a preferred embodiment, the mandelide is R,S and the catalyst is Sn(2-ethylhexanoate)$_2$. A preferred initiator is 4-t-butylbenzylalcohol.

In a solution process, anhydrous mandelide with a moisture content of less than about 2 mole % based upon mandelide monomer is mixed with anhydrous acetonitrile with a water content less than 0.001% by weight. The final concentration of the mandelide is preferably between about 0.5 to 1.5 mol/l, preferably 0.9 mol/l. Then, the solution is heated to a temperature between about 60° C. ~80° C., preferably 70° C., and a solution containing a metal organic ligand catalyst and an initiator at a mole ratio between about 1:1 and 1:2 based upon the mandelide monomer, preferably 1:1 is added under an inert gas atmosphere, such as argon. Preferably, the solution is anhydrous. The ratio of mandelide to catalyst is between about 50~1000 to 1, preferably the ratio is 100:1. The mixture is then preferably maintained at a temperature range between about 70–72° C. Preferably, the temperature is 70° C. for 24 to 48 hours, most preferably 36 hours. Afterwards, the polymer is purified by precipitation into cold methanol or other lower alkanols and polar solvents (5 to 50% by weight in solvent). Non-polar solvents to dissolve the polymer are xylene, toluene, benzene or tetrahydrofuran. Polymer yields are usually about 90% or more. In a preferred embodiment, the mandelide is R,S (R,R/S,S content about 25%) and the catalyst is Sn(2-ethylhexanoate)$_2$. A preferred initiator is 4-t-butylbenzylalcohol.

Specific Examples

In general, the process for making polymandelides produces polymandelides with a molecular weight distribution from about 12,000 to 100,000 and a Polymer Dispersity Index (PDI) of from 1 to 2.0.

SPECIFIC EXAMPLES

The following examples are intended to promote a further understanding of the present invention.

In the examples, the following analytical methods were used to characterize the polymer products made according to the process of the present invention. $^1$H NMR spectra were recorded on Varian Gemini-300 and Inova-300 (299.9 MHz) and Varian Unity-500 (499.9 MHz) spectrometers and referenced to residual proton solvent signals. Differential Scanning Calorimetry (DSC) analyses of the polymers were performed under a helium atmosphere at a heating rate of 10° C. per minute on a Perkin Elmer DSC 7, with the temperature calibrated using an indium standard. The reported DSC curves are second heating scans, taken after an initial heating scan to erase thermal history, and a fast quench to —50° C. Thermogravimetric analysis (TGA) results were performed under a N$_2$ atmosphere at a heating rate of 10° C. per minute on a Perkin Elmer TGA 7 instrument. Molecular weights of the polymers were determined by gel permeable chromatography (GPC) using a Beckman 100A instrument, equipped with a Waters 410 differential refractometer detector. Measurements were obtained in THF with a PL gel 5$\mu$Mix column (Polymer Laboratories) at a flow rate of 1 ml per minute at 35° C. Results were calibrated with monodisperse polystyrene standards.

Example 1

This example shows the synthesis of catalyst [rac-(Salbinap)AlEt]. [rac-(salbinap)AlEt] was synthesized according to Spassky et al., A. Macromol. Chem. Phys. 197: 2627–2637 (1996). This catalyst served as the precursor for the synthesis of rac-2 as shown in Example 2.

In a glove box, a solution of $AlEt_3$ in toluene (1.00 ml, 1.9 M, 1.9 mmole) was added dropwise via syringe to a well cooled stirring suspension containing 1.002 gram (2.04 mmol) of rac-salbinap in 10 ml of toluene. After stirring several hours, the mixture was filtered, washed with pentane, and dried in vacuo, which yielded a pale yellow solid. The characteristics of the catalyst were:

$^1$H NMR ($CDCl_3$, 300 MHz); δ–0.377 (m, 2 H, Al—$CH_2$), 0.608 (t, 3 H, —$CH_3$, J=8 Hz), 6.64 (m, 2 H), 6.98–7.55 (m, 13 H), 7.88–8.09 (m, 6 H), 8.34 (s, 1 H).

Preparation of materials used in the example. Toluene and pentane were pre-dried over sodium and distilled from sodium/benzophenone ketyl. Isopropanol was dried by standard methods. $C_6D_6$ was dried and distilled from 3Å sieves and stored over sodium mirrors. $CDCl_3$ was dried and distilled from 3Å sieves. Argon and nitrogen were purified by passage through a column of MnO on silica or vermiculite. Triethylaluminum was purchased from Aldrich Chemical (Milwaukee, Wis.) and used as received.

Example 2

This example shows the synthesis of rac-2 which is the racemic catalyst [rac-(Salbinap)AlO$^i$Pr]. Rac-2 was made from the [rac-(salbinap)AlEt] which was prepared as shown in Example 1.

In a glove box, 0.029 ml (0.378 mmole) of dry isopropanol ($^i$PrOH) was added dropwise via syringe to a stirring suspension of 0.244 gram (0.447 mmole) of [rac-(Salbinap)AlEt] in 7 ml of toluene. After 1 hour, the solution was filtered and the solvent removed in vacuo, which yielded a yellow solid. The characteristics of the catalyst were:

$^1$H NMR ($C_6D_6$, 300 MHz); δ0.76 (d, 3 H, —$CH_3$, J=6 Hz), 1.43 (d, 3 H, —$CH_3$, J=6.1 Hz), 4.20 (m, 1 H, J=6 Hz), 6.21 (t, 2 H), 6.27–6.41 (m, 3 H), 6.52 (d, 1 H, J=8.5 Hz), 6.89–7.76 (m, 15 H), 7.90 (s, 1 H). Analysis calculated for $C_{37}H_{29}AlO_3N_2$: C, 77.05; H, 5.08; N, 4.86. Found: C, 77.04; H, 5.45; N, 4.45.

Preparation of materials used in the examples. Toluene and pentane were pre-dried over sodium and distilled from sodium/benzophenone ketyl. Isopropanol was dried by standard methods. $C_6D_6$ was dried and distilled from 3Å sieves and stored over sodium mirrors. $CDCl_3$ was dried and distilled from 3Å sieves. Argon and nitrogen were purified by passage through a column of MnO on silica or vermiculite. Triethylaluminum was purchased from Aldrich Chemical and used as received.

Example 3

This example shows the polymerization conditions used to make the rac-PLA using the rac-2 prepared in Example 2.

The standard polymerization procedure was as follows. In a glove box, 0.210 gram (1.46 mmole) of rac-lactide, 8.4 ml (0.0146 mmole) of rac-2, and 4.0 ml of toluene were loaded in a Schlenk flask and the mixture placed in an oil bath at 70° C. and stirred for 48 hours. The solvent was then removed in vacuo, and the resulting polymer was dissolved in a minimal amount of $CH_2Cl_2$ and precipitated from cold methanol. The precipitated polymer was filtered and dried in vacuo. The yields of the dried polymers varied from 0.145 gram to 0.200 gram. Typical $M_w/M_n$ ratios were between 1.04 and 1.06.

Additional polymerizations were performed in order to confirm the presence of a "living" polymerization. Aliquots were taken of the reaction mixture periodically, monitored by $^1$H NMR for percent conversion, and the molecular weights determined by GPC. Plots of the $M_n$ of rac-PLA vs. percent conversion revealed a linear correlation between the two. $M_w/M_n$ ratios were between 1.04 and 1.06.

Example 4

This example shows the polymerization conditions used to make the L-PLA.

The standard polymerization procedure was as follows. In a glove box, 0.210 gram (1.46 mmole) of L-lactide, 8.4 ml (0.0146 mmole) of rac-2, and 4.0 ml of toluene were loaded in a Schlenk flask and the mixture placed in an oil bath at 70° C. and stirred for 48 hours. The solvent was then removed in vacuo, and the resulting polymer was dissolved in a minimal amount of $CH_2Cl_2$ and precipitated from cold methanol. The precipitated polymer was filtered and dried in vacuo. The yields of the dried polymers varied from 0.145 gram to 0.200 gram. Typical $M_w/M_n$ ratios were between 1.04 and 1.06.

Additional polymerizations were performed in order to confirm the presence of a living polymerization. Aliquots were taken of the reaction mixture periodically, monitored by $^1$H NMR for percent conversion, and the molecular weights determined by GPC. Plots of the $M_n$ of rac-PLA vs. percent conversion revealed a linear correlation between the two. $M_w/M_n$ ratios were between 1.04 and 1.06.

Example 5

This example shows the synthesis of a mandelide that was used to make polymandelide according to the process of the present invention.

R,S mandelic acid (10.4 gram, 66.27 mmole) and a catalytic amount of p-toluenesulfonic acid (0.60 gram, 3.5 mmole) were dissolved in 700 ml of mixed xylenes. The solution was heated to reflux and water was removed using a Dean-Stark trap filled with 4 Å molecular sieves. Upon completion of the reaction (about 48 hours), the solution was allowed to cool, and the precipitated R,R and S,S isomers were removed by filtration (4.09 gram, 46%, melting point 193° C., decomp.). The filtrate was evaporated to dryness and the resulting solid was washed with hexane and then washed with ether. The crude solid was recrystallized twice from ethyl acetate and hexanes to give 4.01 gram (45%) of the R,S isomer, melting point 135–137° C. R,R/S,S mandelide (CDCl3): δ6.1 (s, 1H), 7.2–7.3 (m, 5H); R,S mandelide (CDCl3): 5 5.9 (s, 1H), 7.4–7.5 (m, 5H)

Example 6

This example shows the polymerization of the mandelide made in Example 5 using a bulk polymerization process according to the present invention.

R,S mandelide was dried overnight under reduced pressure (5 mTorr, 30° C.). Next, a catalyst solution of Sn(2-ethylhexanoate)$_2$ in toluene was prepared in a dry box. Then the dried R,S mandelide (0.5 gram) was loaded in a glass tube and after adding the catalyst solution, the solvent was removed under vacuum. The glass tube was sealed and placed in an oil bath at 150° C. for an appropriate time period such as 1 to 2 hours. Afterwards, the tube was removed from the oil bath and the polymer recovered by precipitation in cold methanol. Typical polymer yields were greater than 90%.

Polymerizations with added initiator were run similarly except that the appropriate amount of initiator was added as a solution in toluene following the addition of catalyst. The initiator starts the reaction and causes chain propagation.

Example 7

This example shows polymerization of the mandelide made in Example 5 using a solution polymerization process according to the present invention.

Anhydrous acetonitrile (10 ml, water content less than 0.001%, Aldrich Chemicals, Milwaukee, Wis.) was added to 2.5 gram of pre-dried R,S mandelide (R,R/S,S content was about 25%). The solution was heated to 70° C. and the catalyst and initiator solutions were added under an argon atmosphere. The polymerization was sampled at regular intervals. The conversion was determined by $^1$H NMR and the polymer properties were measured by GPC (THF, 1 ml per minute using polystyrene standards).

The NMR data for the polymandelide was as follows. $d^6$-DMSO: $^1$H NMR: δ6.0–6.22 (m, 1H), 6.9–7.4 (m, 5H); $^{13}$C NMR: δ74.3, 127.5, 128.5, 129.2, 132.6, 166.5. The $^{13}$C spectra of polymandelide are shown in FIGS. 19A–19D.

Copolymerization Through Asymmetric Monomers

Simple copolymerization has some shortcomings. If one of the comonomers is not polymerizable, the copolymer cannot be made. Also, the mismatch in reactivity between the comonomers leads to inhomogeneous incorporation of the comonomers into the polymer chain. These problems can be solved by designing the AB monomers shown in Scheme 1. A variety of AB monomers have been synthesized. As shown in Scheme 2, each monomer contains two sites for ring opening, and to a first approximation the two carbonyls of the ring can be treated independently. One site should have a reactivity similar to lactide, while the other should more closely resemble that of a substituted lactide. Thus it is expected that the active end of growing lactide chain will attack the least hindered site on the AB monomer (the lactide carbonyl) at a rate somewhat slower than for lactide, and the ring will open to give the substituted lactic acid residue at the growing chain end.

AB monomers also have limitations. AB monomers only produce copolymers whose composition is 50% A and 50% B. Using mixtures of comonomers, copolymers with any composition of A and B can be produced.

Scheme 1. The comparison between two copolymerization methods

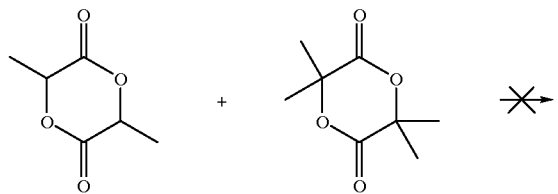

-continued

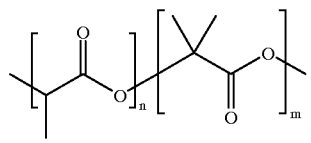

Because monomer A is not polymerizable, the copolymer cannot be synthesized.

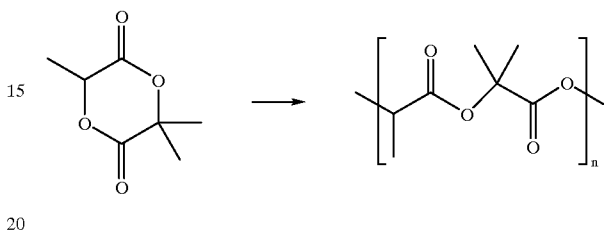

Using an AB monomer, the copolymer can be synthesized.

Scheme 2. Structures of the AB monomers and reactivity of different sites

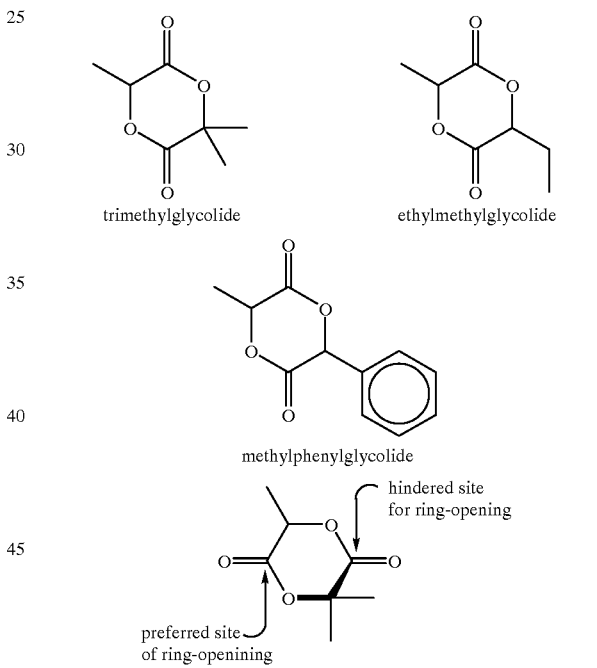

Synthesis and Polymerization of AB Monomers

Figure 20A:
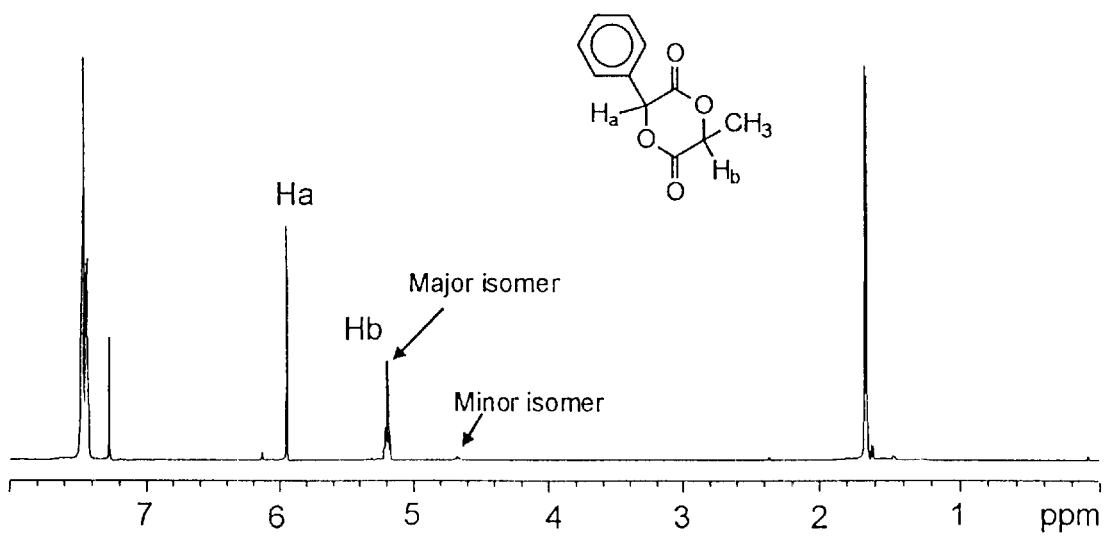
FIGS. 20A and 20B are graphs showing $^1$H NMR spectra of methylphenylglycolide and ethylmethylglycolide.
Figure 20B:
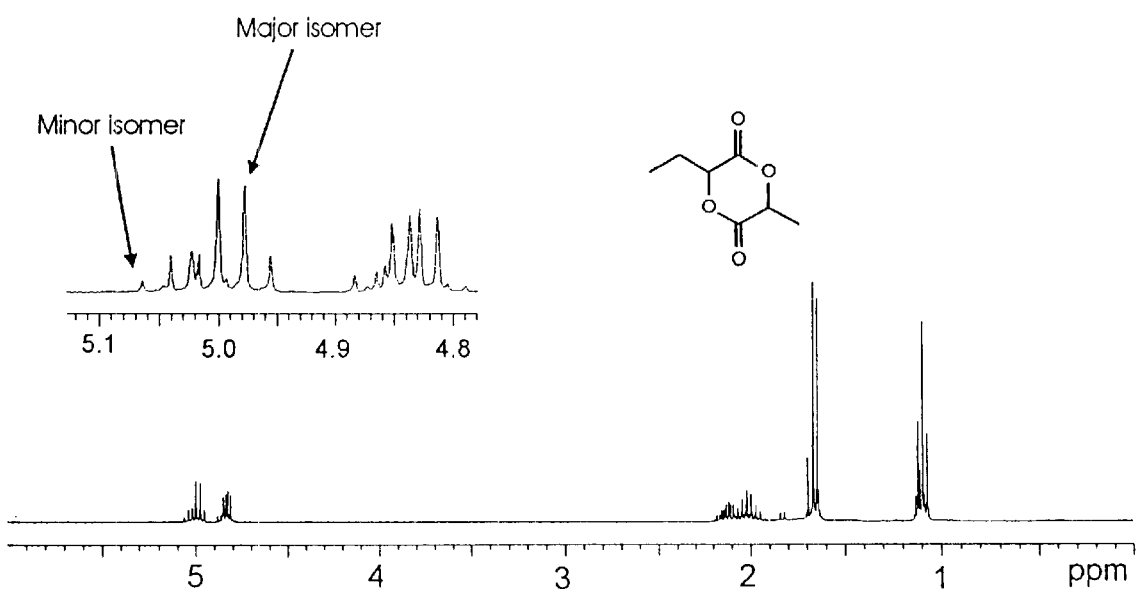
Figure 21:
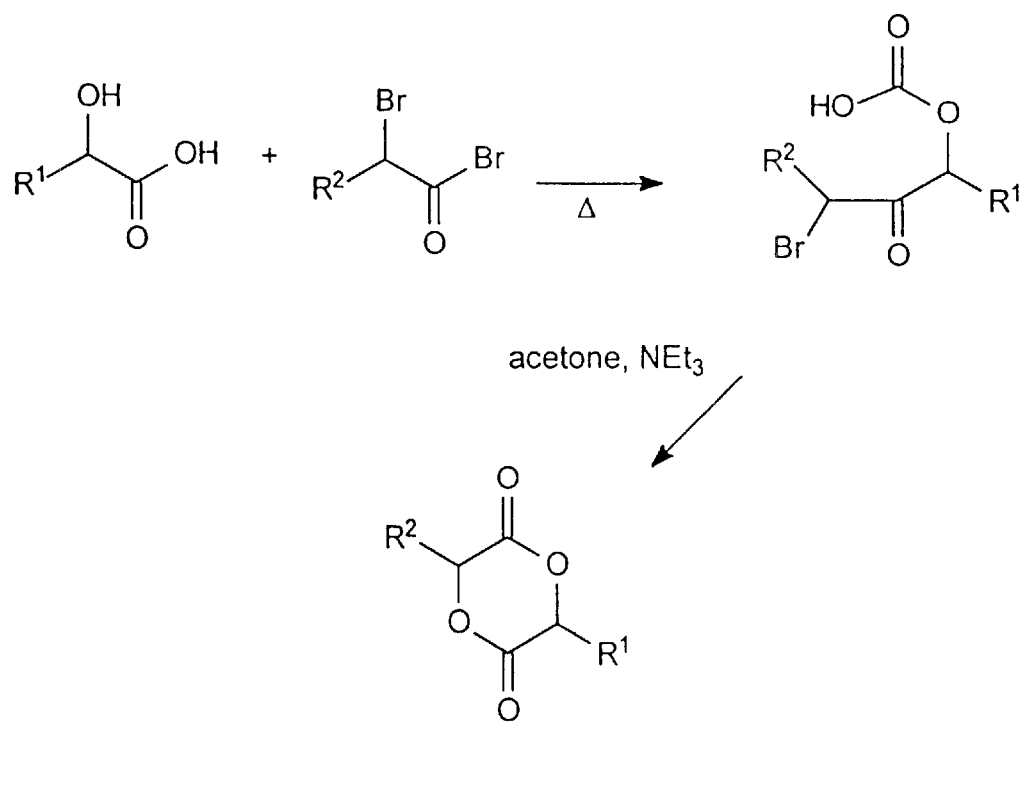
FIG. 21 shows structures of the diastereomers of methylphenylglycolide.
Figure 21:
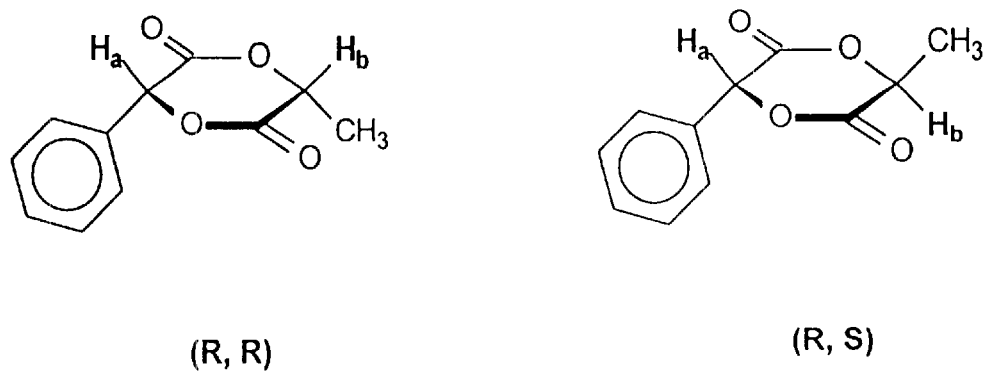
Figure 22:
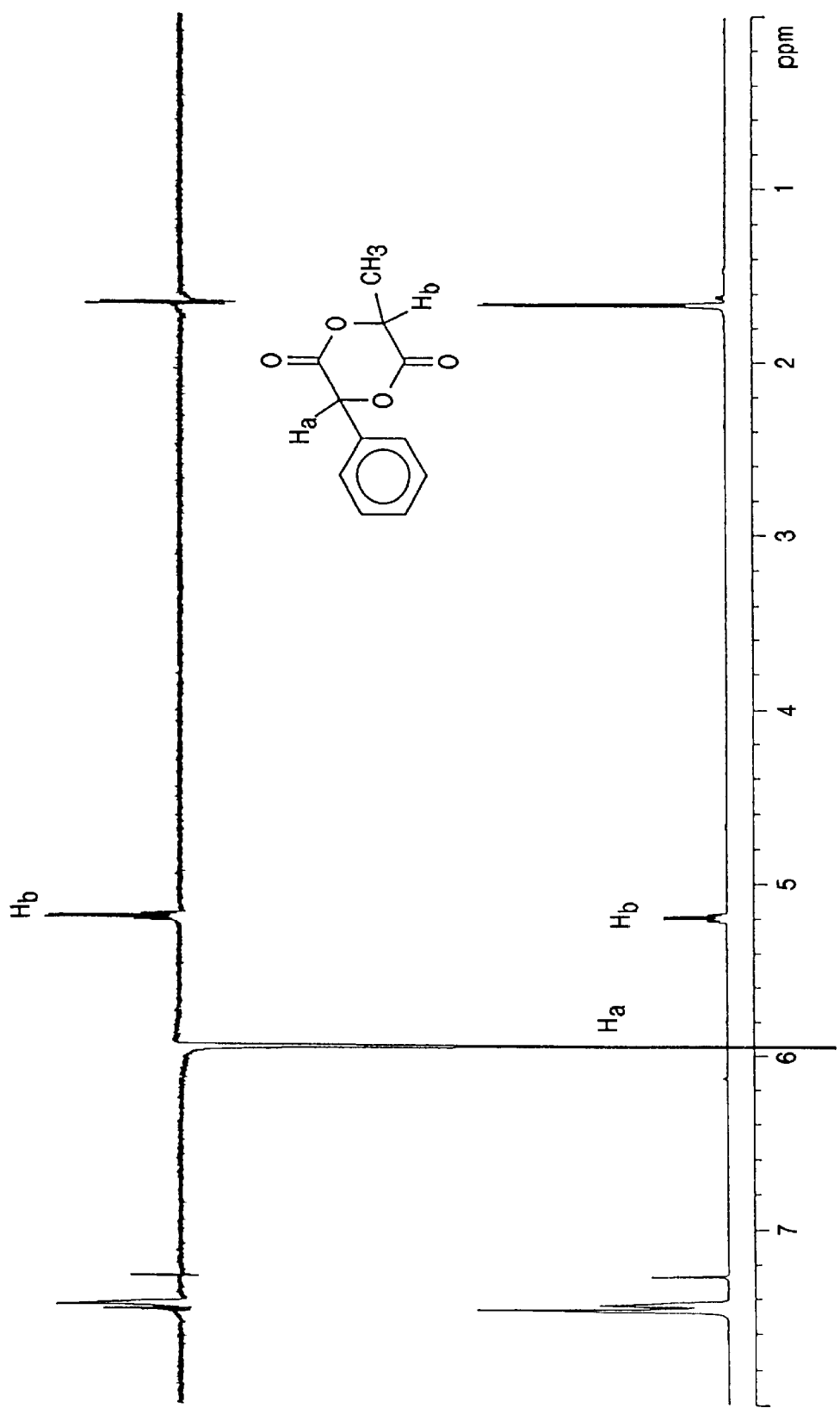
FIG. 22 is a graph showing NOE NMR spectrum of methylphenylglycolide.

As shown in Scheme 3, the AB monomers were prepared by condensation of α-bromopropionyl bromide and the desired lactic acid. In this synthesis, it is important to remove all of the NEt$_3$ during the work-up, since even trace amounts of NEt$_3$ will polymerize the monomer to low molecular weight oligomers. Racemic α-bromopropionyl bromide and racemic lactic acids were used in the syntheses. As shown in FIG. 20, the monomers are not statistical mixtures of R,R, S,S and R,S diastereomers. In the case of ethylmethylglycolide, the diastereomers form in a 3:1 ratio. For methylphenylglycolide, the selectivity is so high that the minor diastereomer is barely seen in the $^1$H NMR spectrum. After recrystallization, the pure diastereomer can be obtained. To identify the major isomer, we obtained the Nuclear Overhauser Effect (NOE) difference NMR spectra of methylphenylglycolide. As shown in FIG. 21, methines $H_a$ and $H_b$ can be attached to the same side of the ring or opposite site of ring. If $H_a$ and $H_b$ are on the same side of ring, the signal of the $H_b$ will be enhanced if $H_a$ is radiated. As shown in FIG. 22, the intensity of $H_b$ increased when $H_a$ was radiated. Thus, the major diastereomer is a mixture of the R,R and S,S isomers, and the minor isomer is the R,S, or S,R isomer. The kinetics of ring-closure probably favor the formation of the R,R and S,S isomers, and ring-closing competes with formation of the oligomers. The selectivity can directly result from the ring closing step, or the selectivity can arise from different rates for conversion of the linear dimers to lactides or oligomers.

Ethylmethylglycolide and methylphenylglycolide can be polymerized to high molecular weight polymer easily. However, trimethylglycolide polymerizes slowly. Even after 24 hours at 180° C., the conversion is only about 75%. It is known that the more substituents the ring has, the more difficult it is for the ring to open. Lactide and other substituted lactides all are di-substituted, and trimethylglycolide is tri-substituted. One extra substituent makes it hard to polymerize.

blocked, one reaction exists in the polymerization, and a perfectly alternating copolymer will form.

For ethylmethylglycolide, $R^1$ is methyl and $R^2$ is ethyl. The size difference is not large, and from the homopolymerization of lactide and ethylglycolide, it is known that the reactivity difference of two monomers is not large. It is expected that poly(ethylmethyolglycolide) is a regio-random polymer. For methylphenylglycolide, $R^1$ is methyl and $R^2$ is phenyl. The phenyl group is much larger than the methyl group, but from studies of the polymerization of mandelide, it is known that the mandelic acid residue should have some reactivity. It is expected that poly(ethylmethylglycolide) is an alternating polymer with some head to head defects. For trimethylglycolide, it is known that tetramethylglycolide is not polymerizable, so it is expected that active center can only attack the lactic acid residue and give poly(trimethylglycolide) as a perfectly alternating polymer.

Figure 23A:
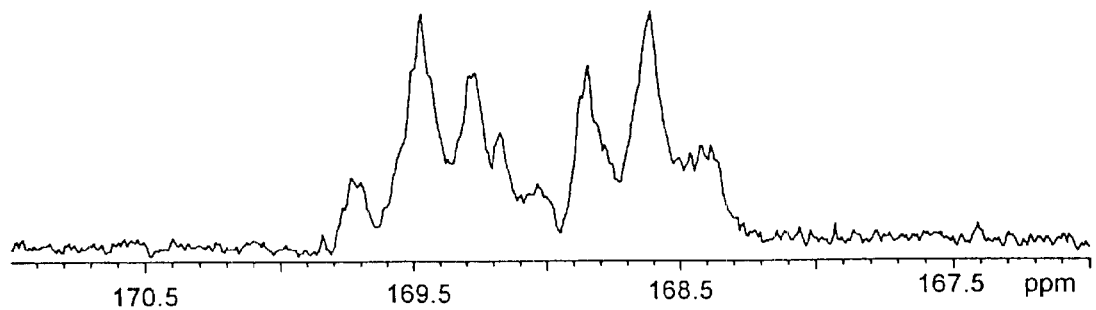
FIGS. 23A, 23B and 23C are graphs showing carbonyl region of $^{13}$C NMR spectra of AB copolymers.

$^{13}$C NMR was used to determine the chain structure of the AB copolymers. The carbonyl region of the $^{13}$C NMR of AB copolymer is shown in FIG. 23. FIG. 23A is the $^{13}$C NMR spectrum of poly(ethylmethylglycolide), which is very complicated. There are signals from two different carbonyl

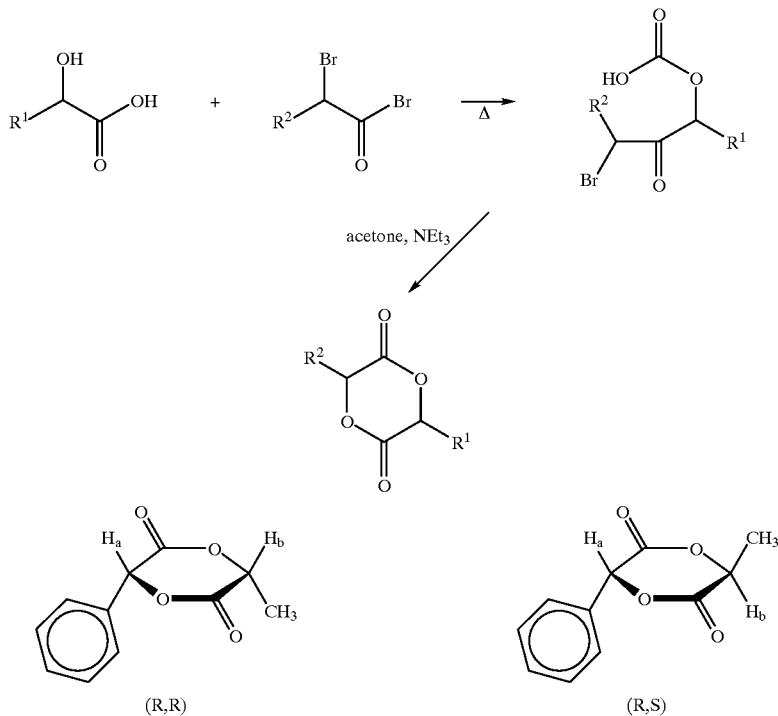

Scheme 3
Synthesis of AB glycolide monomers

Structure of the Polymer Chains

Figure 23B:
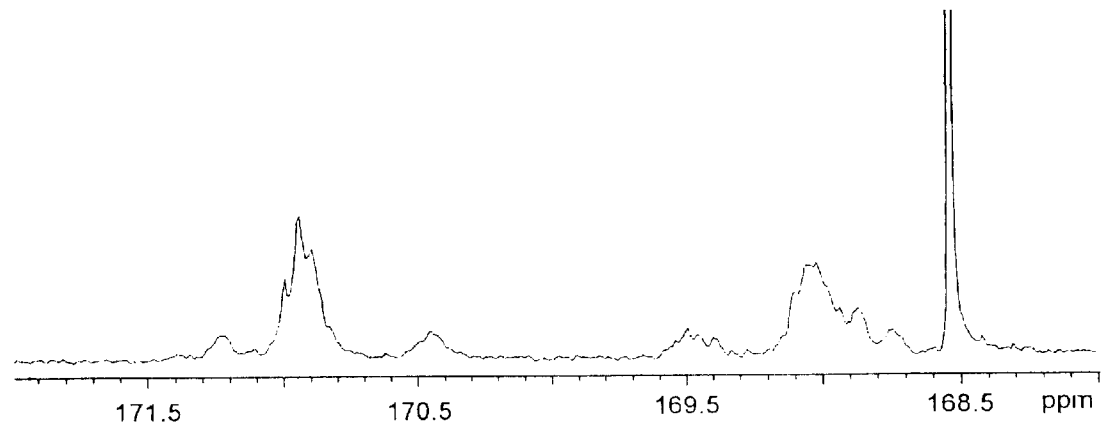
Figure 23C:
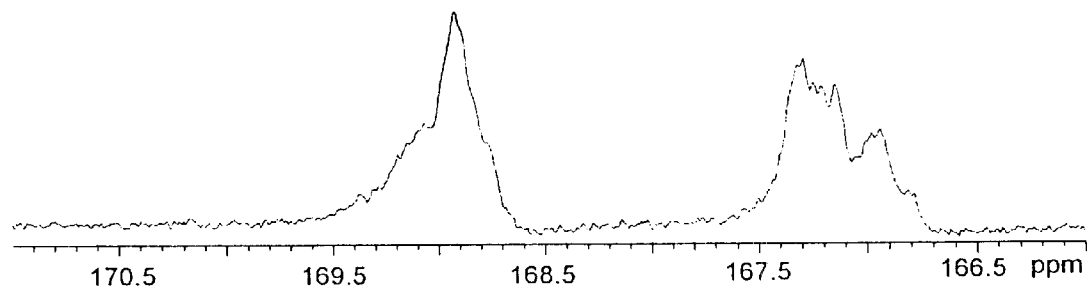

When AB monomers polymerize, there are four possible propagation reactions as shown in Scheme 4. Which reaction dominates depends on the relative size of the $R^1$ and $R^2$ side group. If the size difference of $R^1$ and $R^2$ is small, four reactions co-exist in the polymerization leading to random copolymers. If the size difference of $R^1$ and $R^2$ is large, one of the four reactions dominates, and an alternating $(AB)_n$ polymer with some head to head defects will form. If either $R^1$ or $R^2$ is so large that attack from active center is totally groups: one adjacent to methyl group with chemical shifts from 169 ppm to 169.8 ppm and one adjacent to the ethyl group with chemical shifts from 168.2 ppm to 169 ppm. Both carbonyl groups show multiple peaks, which are caused by the randomness of the chain structure and the stereochemistry of the chain. FIG. 23B is the $^{13}$C NMR spectrum of poly(trimethylglycolide), which shows a simpler pattern. Again, there are signals from two different carbonyl groups: one adjacent to the methyl group with chemical shifts from 168.7 ppm to 169.6 ppm and one adjacent to the dimethyl groups with chemical shifts from 170.3 ppm to 171.3 ppm. Since tetramethylglycolide is not polymerizable, it is thought that the nucleophilic attack occurred exclusively at the lactide residue and that poly (trimethylglycolide) may be a perfectly alternating polymer. Although the carbonyl resonances also show multiple peak patterns, this may be caused by the stereochemistry of the chain, because racemic monomer was used. FIG. 23C is the $^{13}$C NMR spectrum of poly(methylphenylglycolide). Both carbonyl groups have multiple peak patterns, although the resolution is not very good. Because the monomer used in synthesis of AB copolymers are not optically pure, the spectra contains the information of both stereochemistry of chain and structure of chain. It is very difficult to determine the structure of chains. To unambiguously determine the structure of the chain, optically pure monomers are needed. The synthesis of optically pure monomers is obtainable. Scheme 4. The propagation step in the polymerization of AB monomers brown very quickly. It was thought that this was caused by the deprotonation. Second, because of transesterification and because the reactivity difference for attack at the hindered and less hindered side is not large enough, there could be many head-to-head and head to tail placements in the polymer chain. Thus, the polymer chain is not ordered enough to crystallize.

Figure 25:
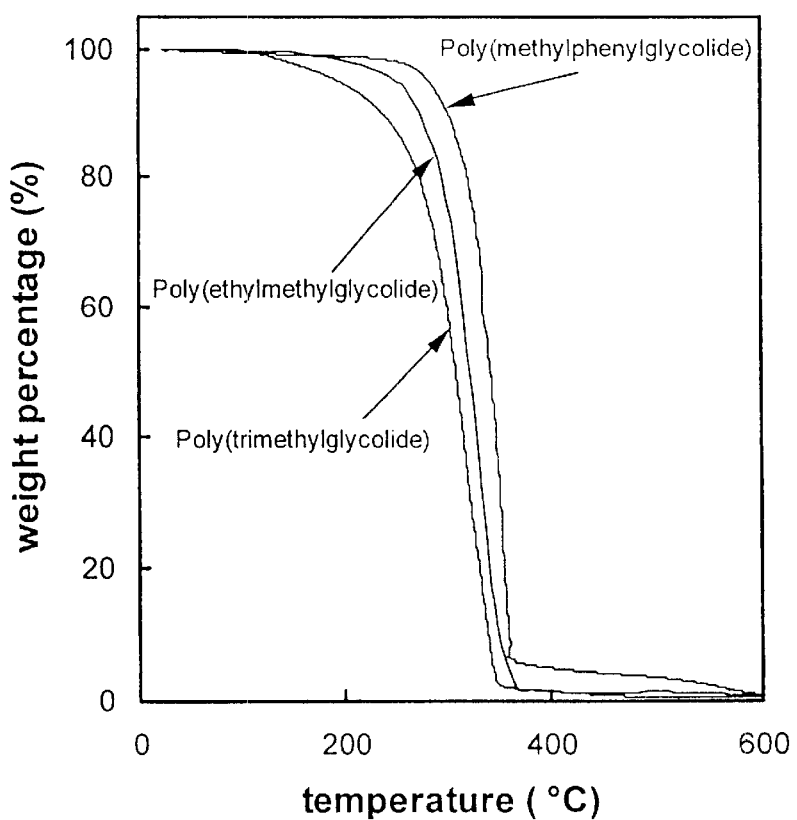
FIG. 25 is a graph showing thermogravimetric analysis results for AB polymers run in air. Heating rate: 40° C./min.

The decomposition temperatures of the polymer are shown in FIG. 25. Poly(trimethylglycolide) has the lowest decomposition temperature, due to the low molecular weight of the polymer. Poly(methylphenylglycolide) shows about 6% residue at 370° C., which then disappears at 600° C. It is not caused by the impurity such as catalyst. It is well known that aromatic polymers often form thermally stable compounds when thermally decomposed.

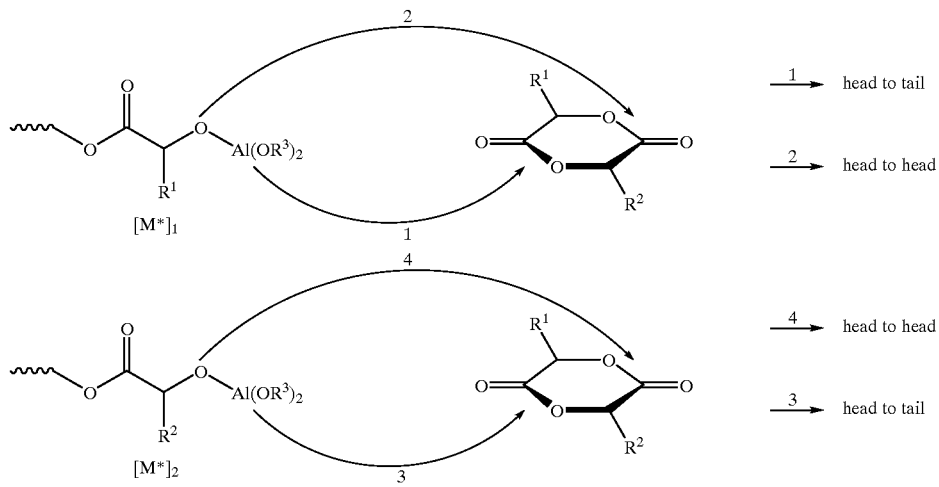

Scheme 4

Thermal Properties of the Copolymer

Figure 24:
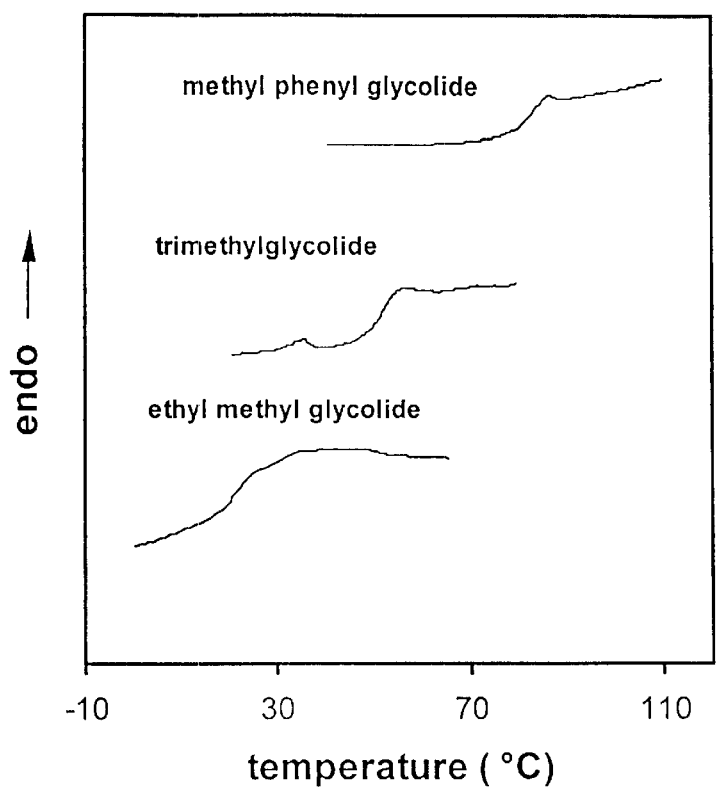
FIG. 24 is a graph showing DSC runs (second heating after flash quenching from 100° C.) for AB polymers. Heating rate: 10° C./min under helium.

DSC was used to measure the glass transition temperatures of the copolymers. The results are shown in FIG. 24 and Table 2. Bulky side chains greatly increase the glass transition temperature of polymers. Poly (methylphenylglycolide) has a glass transition temperature at 85° C. Although, poly(trimethylglycolide) shows a glass transition temperature at 50° C., it should be higher, since the molecular weight of polymer was low (about 4,000). Polymers with molecular weights over 20,000 should have higher glass transition temperatures. None of the polymers were crystalline, which was expected, since the ethylmethylglycolide was a mixture of S,S, R,R, and R,S isomers. Trimethylglycolide and methylphenylglycolide were also racemic. However, (S,S)-methylphenylglycolide and (R,R)-methylphenylglycolide was made from L-mandelic acid and D-mandelic acid, and the copolymers from these optically pure AB monomers are still amorphous. There are two possibilities for the lack of crystallinity in these copolymers. First, the proton α to the phenyl ring is very reactive, and at high temperature this proton may be lost to form a radical or ion. In either case, the polymers are going to be racemized, which inhibits crystallization. During bulk polymerization at 180° C., the reaction mixture changed from colorless to dark

TABLE 2

The properties of AB polymers

| Polymer | $M_n \times 10^{-3}$ [a] | $M_w/M_n$ | $T_g$ ° C.[b] |
|---|---|---|---|
| Poly(ethylmethylglycolide) | 31.2 | 1.81 | 85 |
| Poly(trimethylglycolide) | 35.6 | 1.85 | 50 |
| Poly(methylphenylglycolide) | 4.2 | 1.25 | 22 |

[a]Measured by GPC in THF using polystyrene as standard.
[b]Measured by DSC under He at rate of 10° C./min.

Crystalline Substituted Polylactide

Synthesis and Polymerization of Optical Pure Monomers

Figure 26A:
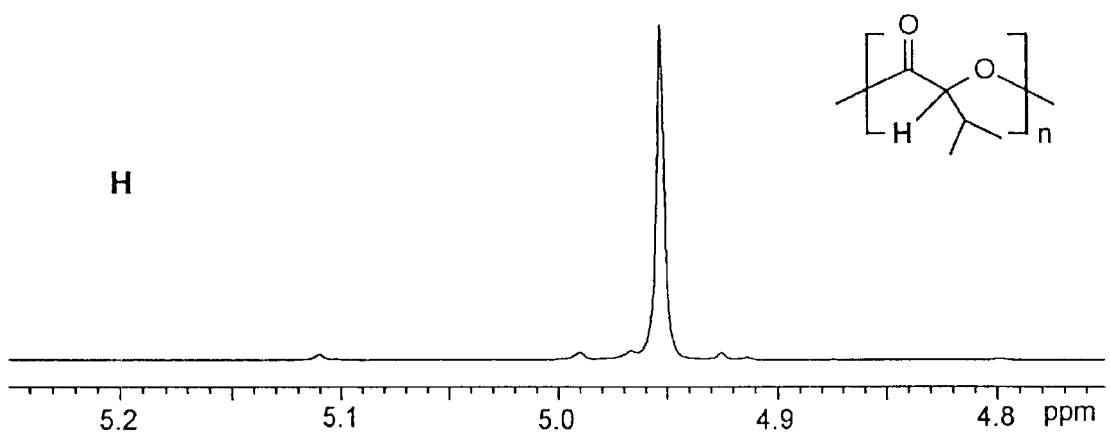
FIGS. 26A and 26B are graphs showing NMR spectra of the methine (26A) and carbonyl (26B) regions of poly(S-isopropylglycolide).
Figure 26B:
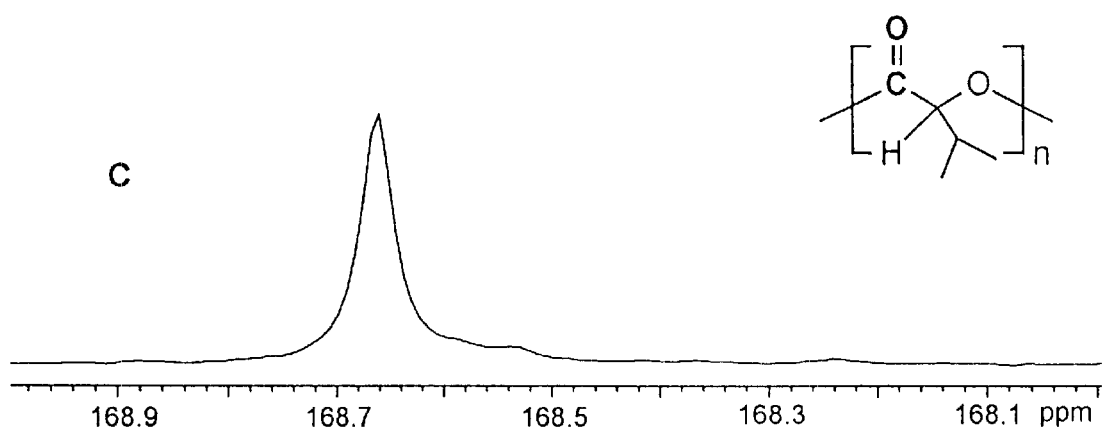

All of the substituted polylactides mentioned above are amorphous polymers because the monomers used to make the polymers are racemic. If optically pure monomers were polymerized, the resulting polymers should show some crystallinity. Since most optically pure 2-hydroxyacids are either not readily available or are very expensive, optically pure 2-hydroxyacids were prepared from amino acids. Optically pure amino acids are easily available and cheap, and the optically pure monomers can be obtained through simple chemical reactions. The synthesis of a monomer from valine is shown in Scheme 5, hereinafter. Valine was treated with NaNO$_2$ in acidic aqueous solution to yield the corresponding 2-hydroxyacid. This reaction proceeds with retention, and thus L-valine yields L-2-hydroxy-3-methylbutyric acid. The synthetic procedure used is a modified version of a literature preparation. The literature preparation uses HCl as the acid, but it was found that about 10% of the product is the 2-chloroacid, which is very difficult to separate from the NMR spectra of poly(S-isopropylglycolide) are shown in FIGS. 26A and 2B. The top trace shows the methine proton region for the methyl decoupled $^1$H NMR spectrum, and the bottom trace shows the carbonyl region of the 13C NMR spectrum. It was concluded that there is almost no racemization during the polymerization, because only one peak is seen in both spectra.

Scheme 5

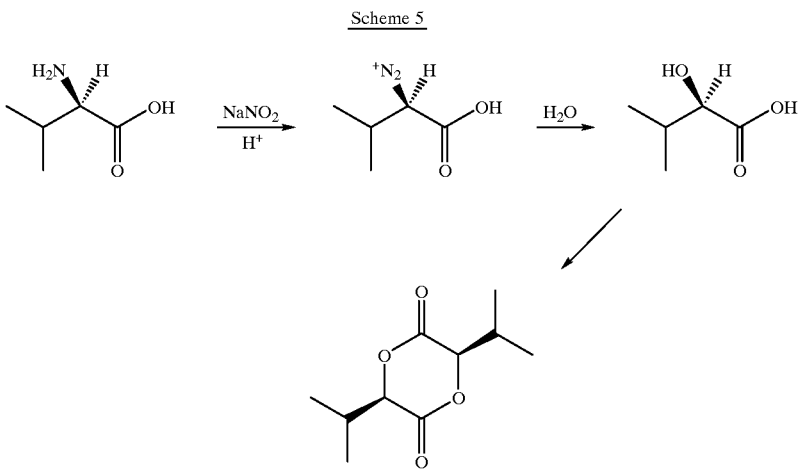

2-hydroxyacid. Switching to dilute H$_2$SO$_4$ gave nearly quantitative yields of the 2-hydroxyacid.

The dimer of 2-hydroxy-3-methylbutyric acid is isopropylglycolide, which was synthesized using the same method used to synthesize other substituted lactides such as ethylglycolide. Because we wanted to obtain optically pure isopropylglycolide, the high temperature cracking process used in making racemic monomers is inappropriate since it leads to some epimerization of the stereocenter. 2-Hydroxy-3-methylbutyric acid was condensed in toluene using p-toluenesulfonic acid as catalyst to give a mixture of the dimer and low molecular weight oligomers. The resulting glycolide was crystallized directly from toluene to give pure S-isopropylglycolide. rac-2-Hydroxy-3-methylbutyric acid gave a mixture of R,R, S,S and R,S isomers, and after recrystallization from ether, only pure rac-isopropylglycolide (1:1 mixture of R,R and S,S isomers) was obtained.

Melt polymerizations carried out at 180° C. using Sn(Oct)$_2$/4-tert-butyl benzoic acid as the catalyst/initiator reached 95% conversion after about one hour. At the beginning of the polymerization, the mixture was an easy to stir liquid, but after several minutes, the mixture became very viscous. After 10 minutes, the polymerization mixture solidified and was impossible to stir. The solidification was caused by crystallization of the polymer, which has a melting point >180° C. The details of crystallization will be discussed later. The molecular weight distribution of the resulting polymer is very broad, with a polydispersity of about 3, probably due to crystallization of polymer. Because of crystallization, the polymerization reaction can become diffusion controlled. If the diffusion rate of monomer is much slower than the polymerization rate, monomer is not evenly distributed in the mixture. Thus, polymerization sites have different propagation rates leading to a mixture of long and short copolymer chains and a broad molecular weight distribution.

The Stereochemistry of the Polymer Chain

A number of the physical properties of poly(lactide) are linked to its stereosequence distribution in the polymer chain. For example, pure isotactic poly(L-lactide) crystallizes at a faster rate and to a larger extent than when L-lactide is polymerized with small amount of either D-lactide or meso-lactide. In the $^1$H and $^{13}$C NMR spectra of polylactides, the observed resonances can be assigned to various stereosequence combinations in the polymer. The assignments are designated as various combination of "i" isotactic pair-wise relationships (—RR— and —SS—) and "s" syndiotactic pair relationship (—RS— and —SR—). In the NMR spectra, the —RR— and —SS— diads and —RS— and —SR— diads are indistinguishable and have identical chemical shifts.

Figure 27:
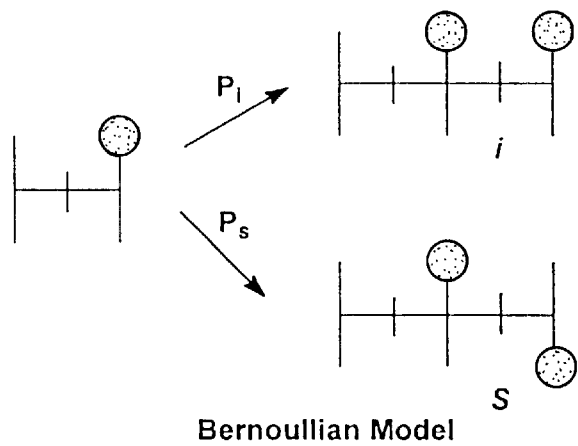
FIG. 27 is a schematic representation of the Bernoulli and first-order Markov model.
Figure 27:
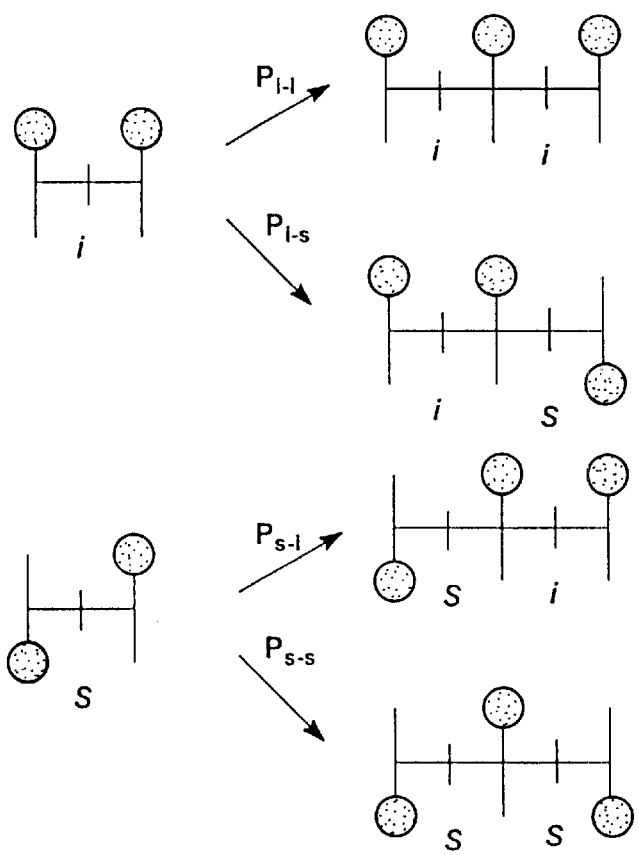

The assignment of resonances for polylactides up to hexads has been made by several research groups. Bernoulli and first-order Markov models have been used to rationalize the assignments. In FIG. 27 are shown the building of a polymer chain by a Bernoulli and a first-order Markov process. In the Bernoulli model, the stereochemistry of chain end is not important, which means that stereochemistry of the chain end does not influence the addition of the monomer to the chain end. In the first-order Markov model, the stereochemistry, which may be i or s is strongly influenced on the adding of monomers to the chain end.

Figure 28:
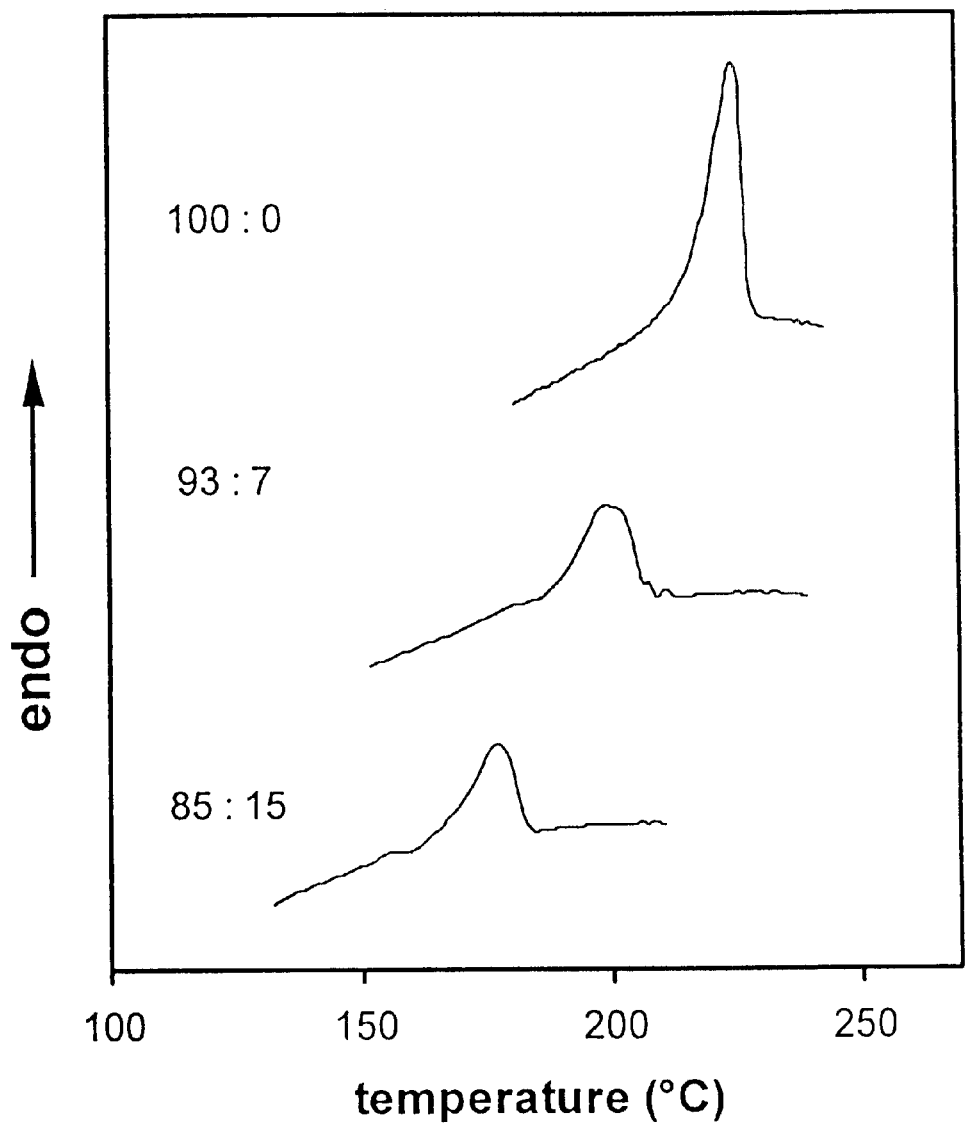
FIG. 28 is a graph of DSC runs showing the melting point for poly(isopropylglycolide)s prepared from S and rac-isoproplyglycolide. The ratios are the S:rac content in the polymers.

The physical properties of poly(isopropylglycolide) are also dependent on the stereosequence of the polymer chain. As shown in FIG. 28, pure poly(S-isopropylglycolide) has a melting point around 230° C. The melting point of poly(isopropylglycolide) decreases when S-isopropylglycolide is polymerized with a small amount of rac-isopropylglycolide. From measurements of the heat of fusion, it was found that the extent of crystallization also decreased. As was done with polylactide, the assignment of the stereosequences of poly(isopropylglycolide) is needed to understand the relationship between the physical properties of poly(isopropylglycolide) and stereochemistry of the polymer chain.

Figure 29C:
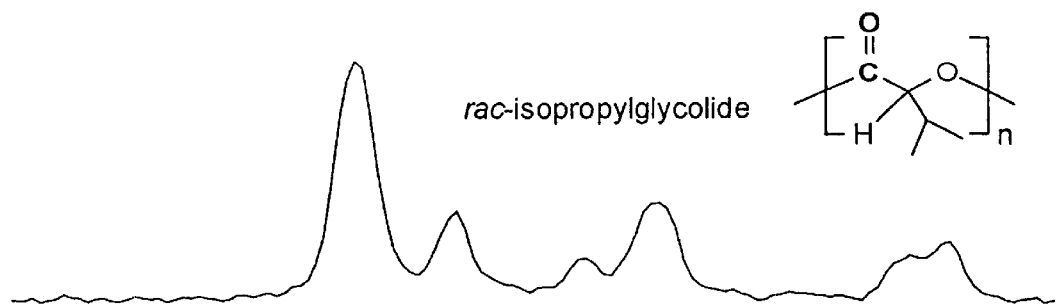
FIGS. 29A, 29B and 29C are graphs showing $^{13}$C NMR spectra of rac, 85% S and 15% rac, and S poly (isopropylglycolide).
Figure 29B:
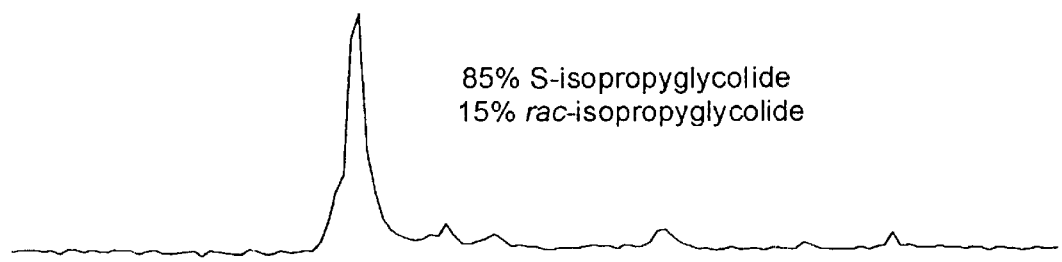
Figure 29A:
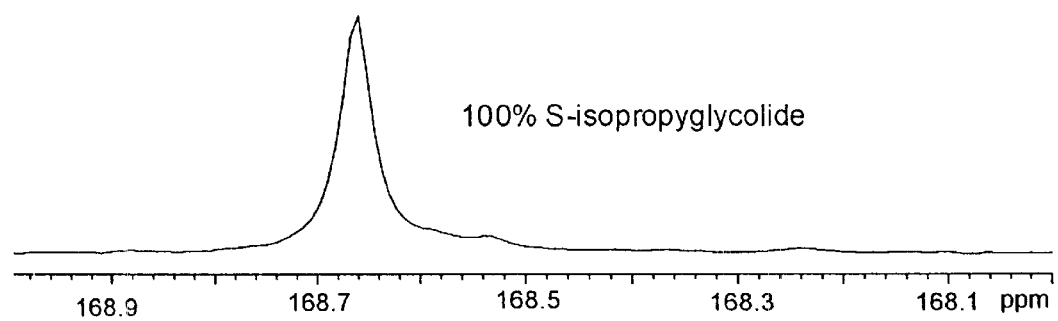
Figure 31:
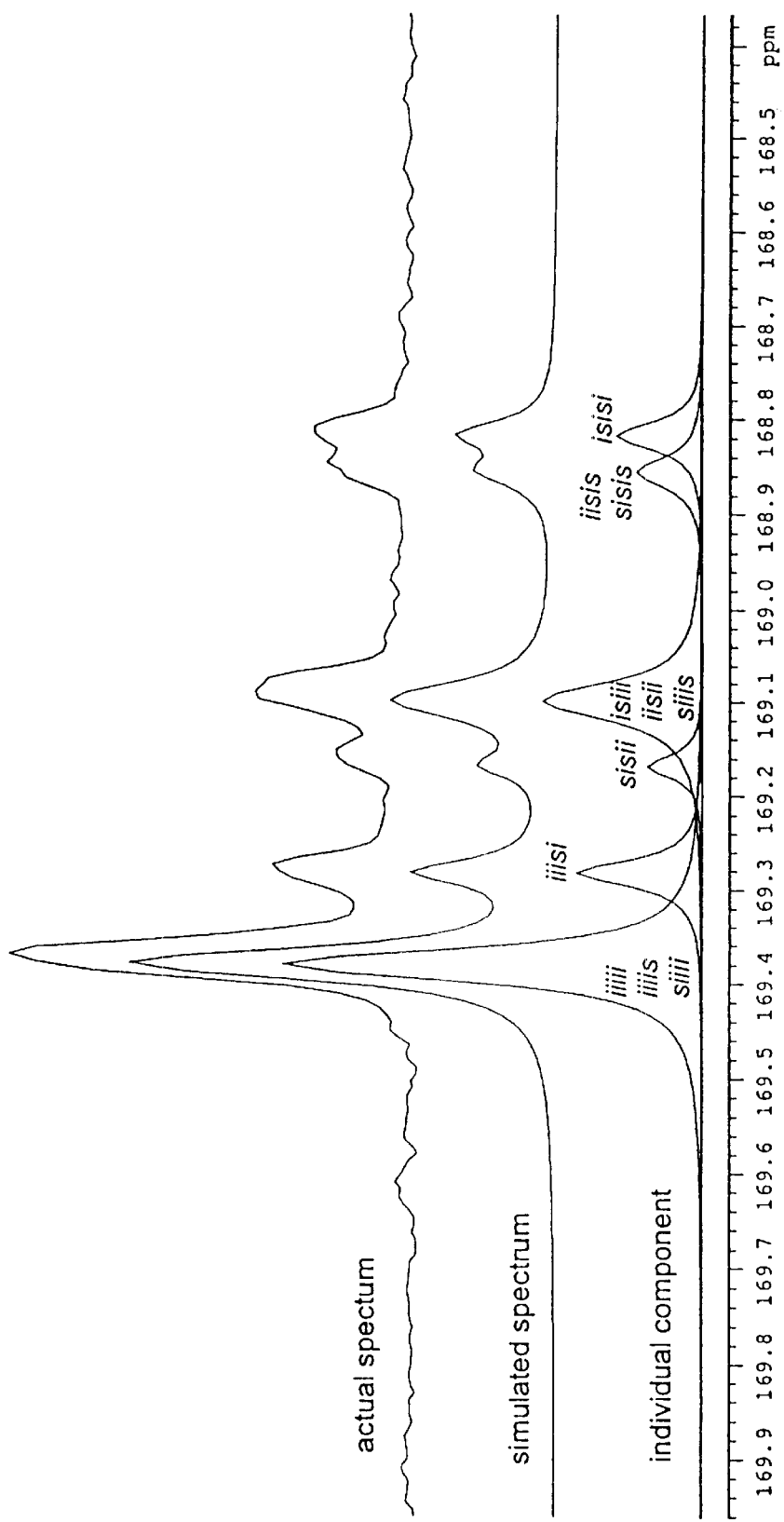
FIG. 31 is a graph showing stereosequence assignments for the $^{13}$C spectrum of poly(rac-isopropylglycolide).

The stereochemical assignments were made by comparing the trends observed in the spectra of a number of poly(isopropylglycolide)s to the probability distribution expected on the basis of their lactide feed composition. Shown in FIG. 29 and FIG. 30 are the carbonyl region of the $^{13}$C NMR of poly(isopropylglycolide) and the methine region of $^1$H NMR of poly(isopropylglycolide). Trace A in each figure is spectrum of the polymer prepared from 100% S-isopropyglycolide. The single peak in both spectra can be identified as resulting from an iiiii sequence. The B traces are spectra for the polymers prepared from 85% R-isopropylglycolide and 15% racemic isopropylglycolide. In addition to the iiiii peak, several new peaks appeared. Because the amount of S-isopropylglycolide is small, probability dictates that these peaks should be isiii and iiisi sequences. By comparing the spectra from samples with different ratios of S-isopropylglycolide and rac-isopropylglycolide, all 11 hexads of the polymer chain were assigned. The result is shown in FIG. 31. Because the resolution of $^1$H NMR spectrum is not as good as for the $^{13}$C NMR, stereosequences in the $^{13}$C NMR spectrum were only assigned.

The unusual intensity of the iiiii hexad in the poly(rac-isopropylglycolide) spectrum suggests that the polymerization follows non-Bernoullian statistics and stereoselection occurs during the polymerization of rac-isopropylglycolide. The first-order Markov model was used to describe such a process. It is assumed that the probabilities for an RR monomer adding to an RR chain end and an SS monomer adding to an SS chain end are p, and the probabilities of an RR monomer adding to an SS chain end and an SS monomer adding to an RR chain end are (1–p). It is possible to calculate the expected intensity values of the individual sequences as shown below:

$$iiiii = p^3 + 0.5p^2 (1-p)$$

$$iiiis = siiii = iisii = 0.5p^2 (1-p)$$

$$iiisi = isiii = 0.5p^2 (1-p) + 0.5p (1-p)^2$$

$$iisis = siiis = sisii = 0.5p(1-p)^2$$

$$isisi = 0.5p(1-p)^2 = 0.5 (1-p)^3$$

$$sisis = 0.5(1-p)^3$$

The experimental values and calculated values were compared using equation $\Sigma[(I_{ca} - I_{exp})/I_{exp}]^2$, where $I_{cal}$ is calculated peak intensity and $I_{exp}$ is experimental peak intensity. It was found that when p=0.61, the $I_{cal}$ is closest to $I_{exp}$. The result is shown in Table 3. It indicates a preference for addition RR monomer to the RR chain end and SS monomer addition to SS chain end, which enhances contribution of isotactic segments in poly(isopropylglycolide). This result is very different from that obtained for polylactide, where several authors reported that the lactide polymerization favors syndiotactic chain segments (p<0.5). The reason for this difference is not clear and is still under investigation.

TABLE 3

Experimental and calculated values of hexad intensities in the carbonyl region of $^{13}$C NMR spectra of poly(rac-isopropylglycolide)

|  | iiiii + sii ii + iiiis | iiisi | sisii | isiii + iis ii + siiis | iisis + sisis | isisi |
|---|---|---|---|---|---|---|
| Experimental values | 46.2 | 11.8 | 4.4 | 22.3 | 7.07 | 8.25 |
| Calculated values (p = 0.61) | 44.4 | 11.9 | 4.6 | 23.8 | 7.61 | 7.61 |

The Crystallinity of Poly(isopropylglycolide)

Figure 32:
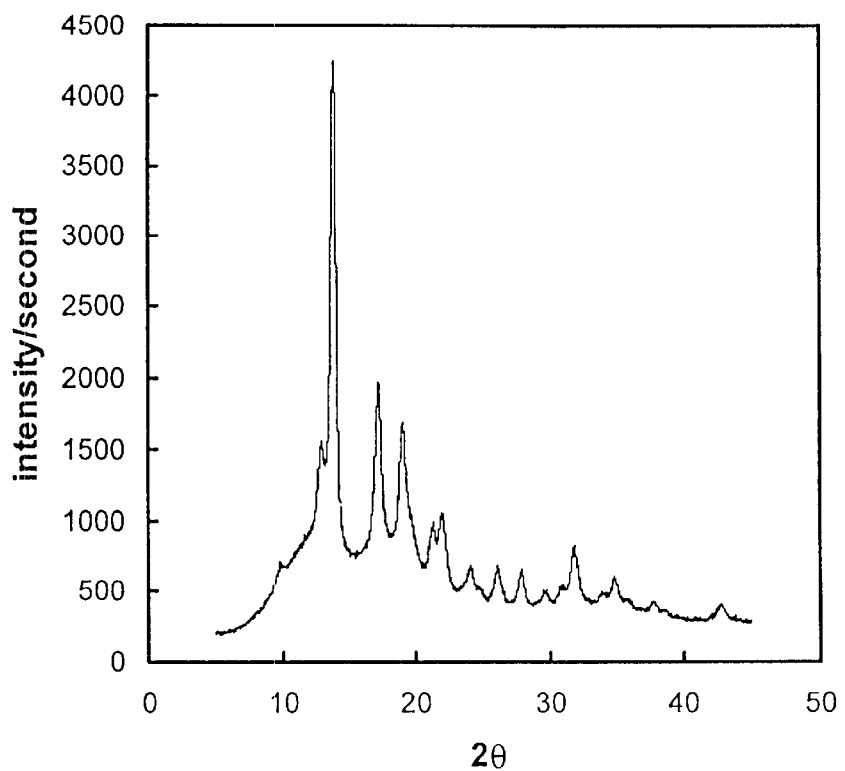
FIG. 32 is a graph showing the X-ray diffraction pattern for crystalline poly(S-isopropylglycolide).
Figure 33:
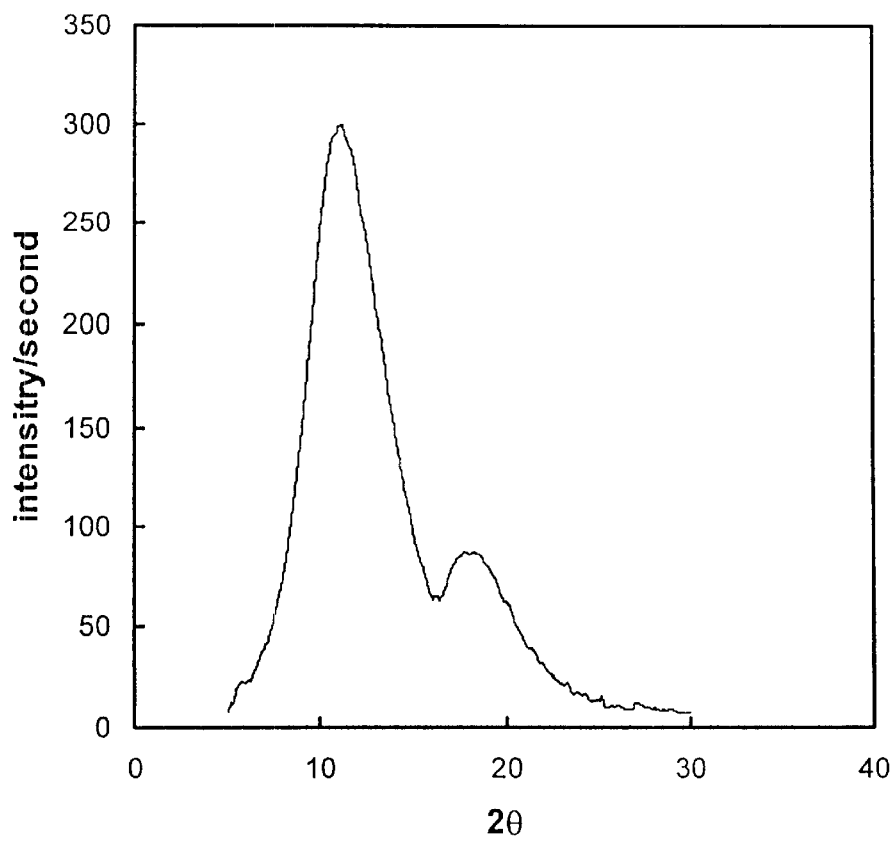
FIG. 33 is a graph showing the X-ray diffraction pattern for amorphous poly(rac-isopropylglycolide).
Figure 34:
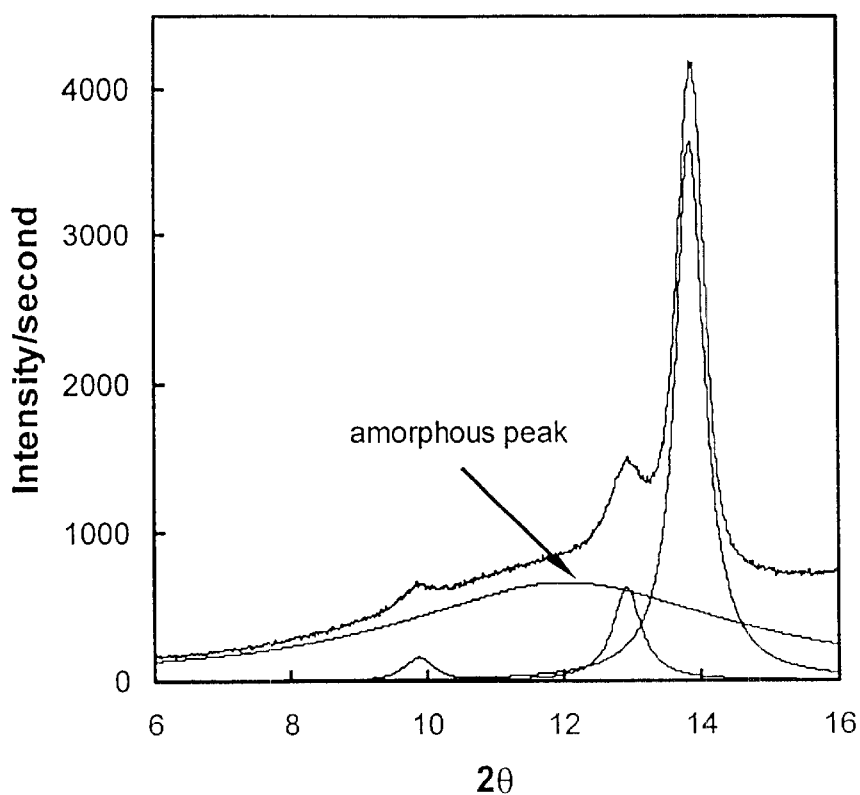
FIG. 34 is a graph showing peak deconvolution of the X-ray diffraction pattern for crystalline poly(S-isopropylglycolide).

X-ray diffraction was used to determine the crystallinity of poly(R-isopropylglycolide). This method has been used by Hermans and Weidinger to measure the crystallinity of polyethylene, polypropylene, and polystyrene. The X-ray diffraction pattern of crystalline poly(isopropylglycolide) is shown in FIG. 32. A valid procedure for subtracting the amorphous scattering from the total scattering is always the first and most essential step in any attempt to derive a measure of crystallinity from X-ray diffraction. However, unavoidably, it always involves certain uncontrollable assumptions. The X-ray diffraction pattern for amorphous poly(isopropylglycolide) made from rac-isopropylglycolide is shown in FIG. 33. The amorphous sample shows a broad peak with maximum at about 12 degrees. It is assumed that the amorphous fraction in the crystalline sample should have the same maximum and the same line-shape. To make the problem easier, a 10-degree window was selected, 6–16 degrees, for the calculation. PeakSolve software was used to deconvolute the diffraction pattern into amorphous and crystalline components. The result is shown in FIG. 34. The area under amorphous peak is $O_{am}$ and the area under three crystalline peaks is $O_{cr}$.

The degree of crystallinity is calculated by comparing the results from two or more samples of the same polymer with crystalline fraction $X_1$ and $X_2$, where $X_1 - X_2$ is as large as possible. Then, $X_1$ and $X_2$ can be described using the following equation:

$$X_1/X_2 = O_{cr1}/O_{cr2}$$

$$(1-X_1)/(1-X_2) = O_{am1}/O_{am2}$$

Figure 35:
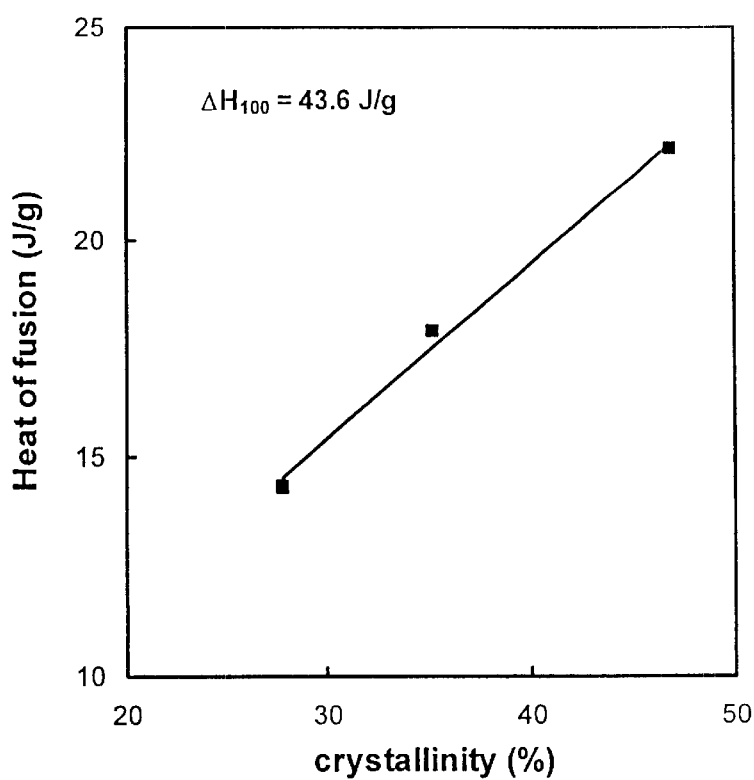
FIG. 35 is a graph showing determination of heat of fusion for 100% crystalline poly(isopropylglycolide).

The crystallinity of several different poly(isopropylglycolide) samples are shown in Table 4. The crystallinity data and the heat of fusion measured using DSC were combined to estimate the heat of fusion for a 100% crystalline sample. By plotting the heat of fusion vs. crystallinity of sample, the data from FIG. 35 was used to estimate the heat of fusion for 100% crystallinity. The result, 43.6. J/g, is about half that of polylactide's 100 J/g.

TABLE 4

The crystallinity and heat of fusion of poly(isopropylglycolide)

| Samples | Crystallinity[a] (%) | Heat of fusion (ΔH J/g) |
|---|---|---|
| 1 | 46.9 | 22.1 |
| 2 | 35.2 | 17.9 |
| 3 | 27.8 | 14.3 |

[a]Estimated from X-ray analysis of samples

Example 8

Monomer Preparation 3S,6S-Diisopropyl-1,4-dioxane-2,5-dione (S-isopropylglycolide)

S-isopropylglycolide was synthesized from L-2-hydroxy-3-methyl butyric acid. The S-isopropylglycolide was recrystallized from toluene. The white crystals were collected by filtration and dried under vacuum. Yield 43%, $[\alpha]_{20}=-264.0$ (c=1, THF). $^1$H NMR (300 MHz, CDCl$_3$): δ4.95 (d, 1H), 2.30 (m, 1H), 1.03 (d, 3H), 1.01 (d, 3H). $^{13}$C NMR (75 MHz, CDCl$_3$) δ: 166.38, 79.55, 29.36, 19.55, 15.81. MS (m/z) 201.4 (M+1), mp 140–141° C. The S-isopropylglycolide is 99% ee as determined by hydrolyzing S-isopropylglycolide to 2-hydroxy-3-methyl butyric acid and comparing the optical rotation value of the acid with known value ($[\alpha]_{20}=+19.0$ c=1 CHCl$_3$) from the Aldrich catalog.

Example 9

2-hydroxy-3-methylbutyric acid.

A solution of 60 mL concentrated H$_2$SO$_4$ in 1L water was cooled in an ice bath. To the cooled solution was added 60 g of valine followed by the dropwise of 144 g NaNO$_2$ dissolved in 1L water. After the solution was stirred at 0° C. for overnight, the solution was extracted with ether (6×300 mL), and the ether layer was dried over MgSO$_4$. After removing the ether, the product was purified by recrystallization from toluene. The white crystals were collected by filtration and dried under vacuum to give 45 g (75%) of 2-hydroxy-3-methyl butyric acid as a white solid. DL-2-hydroxy-3-methyl butyric acid was obtained from DL-valine and L-2-hydroxy-3-methyl butyric acid was prepared from L-valine. The L-2-hydroxy-3-methyl butyric acid was obtained in 99% ee based on measurement of its optical rotation ($[\alpha]_{20}=+18.9$ c=1 CHCl$_3$).

Example 10

Unsymmetric Monomer Synthesis, General Procedure

Under a nitrogen atmosphere, one equivalent of a 2-hydroxy acid and one equivalent of a 2-bromoacyl bromide were heated at 80° C. until HBr evolution ceased (0.5–2 hours). The solution was cooled and 200 mL of dry acetone was added for each gram of acid, followed by the dropwise addition of two equivalents of triethylamine. The solution was heated to reflux for 6 hours, and then was cooled. After removing the acetone, ethyl acetate was added to dissolve the residue. The solution was washed with 2N HCl, water, then washed with sat. NaHCO$_3$, and the organic layer was dried over MgSO$_4$. After removing solvent, the monomers were purified by recrystallization and distillation.

Example 11

3-ethyl-6-methyl-2,5-dioxane-1,4-dione was synthesized from 2-hydroxybutyric acid and 2-bromopropionyl bromide. It was purified by distillation (45° C./50 mtorr) to give a colorless oil. Yield: 53% $^1$H NMR (CDCl$_3$) δ5.03 (q), 4.99 (q, 1H for signal at 5.03 and 4.99 ppm), 4.86 (dd), 4.83 (dd, 1H for signal at 4.86 and 4.83), 1.90–2.20 (m, 2H), 1.69 (d), 1.66 (d, 3H for signals at 1.69 and 1.66 ppm). 1.15 (t). 1.14 (t, 3H for signals at 1.15 and 1.14 ppm). $^{13}$C NMR (CDCl$_3$) δ167.6, 166.8, 166.3, 165.6, 77.7, 76.6, 72.5, 72.2, 25.3, 23.3, 17.5, 15.7, 9.1, 8.7, MS (m/q) 159.4 (M+1). The product is approximately a 3:1 mixture of the R,R/S,S and R,S diastereomers.

Example 12

3-dimethyl-6-methyl-2,5-dioxane-1,4-dione (8) was synthesized from 2-hydroxyisobutyric acid and 2-bromopropionyl bromide. Recrystallization from ether gives white crystals. Mp 66–69° C. Yield: 43%. $^1$H NMR (CDCl$_3$) δ5.07 (q, 1H), 1.68 (s, 6H). 1.65 (d, 3H). $^{13}$C NMR (CDCl$_3$)δ 168.59, 166.64, 80.55, 72.92, 26.25, 25.31, 17.45 MS (m/q) 159.4 (M+1).

Example 13

3-methyl-6-phenyl-2,5-dioxane-1,4-dione (9) was synthesized by using mandelic acid and 2-bromopropionyl bromide. Recrystallization from toluene gave white crystals. Mp 153–156° C. Yield: 33%. $^1$H NMR (CDCl$_3$) δ7.43 (m, 5H), 5.92 (s, 1H) 5.17 (q, 1H), 1.63 (d, 3H). $^{13}$C NMR (CDCl$_3$ δ166.90, 165.55, 131.24, 129.95, 128.92, 127.44, 77.74, 72.77, 16.42 MS (m/q) 207.4 (M+1).

Example 14

S-3-methyl-S-6-phenyl-2,5-dioxane-1,4-dione was synthesized from S-mandelic acid and 2-bromopropionyl bromide. Recrystallization from toluene gave white crystals. Mp 160–163° C., yield: 41%. $[\alpha]_{20}=+301.0$ $^1$H NMR (CDCl$_3$) δ7.43 (m, 5H), 5.92 (s, 1H) 5.17 (q, 1H), 1.63 (d, 3H). $^{13}$C NMR (CDCl$_3$) δ166.90, 165.55, 131.24, 129.95, 128.92, 127.44, 77.74, 72.77, 16.42. MS (m/q) 207.4 (M+1).

Example 15

R-3-methyl-R-6-phenyl-2,5-dioxane-1,4-dione was synthesized from R-mandelic acid and 2-bromopropionyl bromide. Recrystallization from toluene gave white crystals. Mp 160–163° C., yield: 35%. $[\alpha]_{20}=-302.0$. $^1$H NMR (CDCl$_3$) δ7.43 (m, 5H), 5.92 (s, 1H) 5.17 (q, 1H), 1.63 (d, 3H). $^{13}$C NMR (CDCl$_3$) δ166.90, 165.55, 131.24, 129.95, 128.92, 127.44, 77.74, 72.77, 16.42. MS (m/q) 207.4 (M+1).

Bulk Polymerization of Substituted Glycolides

Solvent-free polymerizations were carried out in sealed tubes prepared from ⅜ inch diameter glass tubing. A representative polymerization is described below. In an oxygen and moisture-free dry box, a solution of initiator in toluene (≈0.01 M) and 0.1 g of monomer were added to the tube. The amount of initiator solution added was determined by the desired monomer/initiator ratio. For runs using initiators that are insoluble in toluene, the initiator was added directly to the tube and the walls of the tube were washed with solvent to ensure that all of the initiator was added to the monomer. The solvent was removed in vacuum, and the tube was sealed and immersed in an oil bath at 130° C. At the end of the polymerization, the tube was cooled, opened, and the polymer was dissolved in THF. A portion of the sample was evacuated to dryness and analyzed by NMR for conversion. After removal of the solvent, the polymer was dissolved in toluene and precipitated into methanol to remove residual initiator. Typical yields of poly(ethylglycolide) were>85%. For kinetic runs, multiple tubes were prepared and individual tubes were removed from the heating bath at predetermined intervals and were cooled in ice, opened, and the contents dissolved in THF. A portion of the sample was analyzed by GPC for molecular weight, and the remainder was evacuated to dryness and analyzed by NMR for conversion. Polymerizations that used alcohols as co-initiators were set up as described above, except that the appropriate amount of alcohol was added to the toluene solution of initiator just prior to adding the initiator solution to the tube. For insoluble initiators, tubes were first loaded with monomer and initiator, and the alcohol co-initiator was directly added to the tube as a toluene solution.

Solution Polymerization of Substituted Glycolides

The reaction flask was charged with 2 mmol of monomer and dried under vacuum (diffusion pump) at room temperature overnight. Toluene (10 mL) was added to the solvent flask through a rubber septum with a syringe and the toluene was purified by initiating an anionic polymerization of styrene. The solvent was transferred under vacuum to the reaction flask and the initiator Al(OiPr)$_3$ or Sn(Oct)$_2$ was added into reaction flask with a syringe through a rubber septum. The amount of initiator solution added was determined by the desired monomer/initiator ratio. The polymerization was carried out at 70° C., 90° C. and 100° C. After the polymerization finished, the reaction was terminated with 1 mL 2N HCl then washed with distilled water until pH=7. The polymer was precipitated into cold methanol, filtered and dried under vacuum. For kinetic studies, small samples were removed at predetermined times using a syringe through the rubber septum. The samples were analyzed by NMR for conversion and GPC for molecular weight.

Example 16

Melt Polymerization of AB Monomers 3-phenyl-6-methyl-1,4-dioxane-2,5-dione

In an oxygen and moisture-free dry box, 0.1 g of 3-phenyl-6-methyl-1,4-dioxane-2,5-dione was added to a glass tube. A 0.01M solution of Sn(2-ethylhexanoate)$_2$ catalyst in toluene was added to the tube to make the monomer:catalyst ratio=500, followed by a solution of t-butylbenzyl alcohol in toluene to make the monomer:initiator ratio =500. The tube was briefly connected to a vacuum line to remove the toluene and was then sealed with a torch. The sealed tube was placed in an oil bath controlled at 180° C. After 2 hours, the tube was removed from the bath, cooled, and was broken to recover the polymer. Dissolution of the polymer in toluene and precipitation of the polymer in cold methanol gave a polymer with a glass transition at 85° C., a number average molecular weight of 43,500, and a polydispersity of 1.68.

Example 17

3-dimethyl-6-methyl-1,4-dioxane-2,5-dione

In an oxygen and moisture-free dry box, 0.1 g of 3-dimethyl-6-methyl-1,4-dioxane-2,5-dione was added to a glass tube. A 0.01M solution of Sn(2-ethylhexanoate)$_2$ catalyst in toluene was added to the tube to make the monomer:catalyst ratio=500, followed by a solution of t-butylbenzyl alcohol in toluene to make the monomer:initiator ratio=500. The tube was briefly connected to a vacuum line to remove the toluene and was then sealed with a torch. The sealed tube was placed in an oil bath controlled at 180° C. After 2 hours, the tube was removed from the bath, cooled, and was broken to recover the polymer. Dissolution of the polymer in toluene and precipitation of the polymer in cold methanol gave a polymer with a glass transition temperature of 50° C.

Example 18

3-ethyl-6-methyl-1,4-dioxane-2,5-dione

In an oxygen and moisture-free dry box, 0.1 g of 3-ethyl-6-methyl-1,4-dioxane-2,5-dione was added to a glass tube. A 0.01M solution of Sn(2-ethylhexanoate)$_2$ catalyst in toluene was added to the tube to make the monomer:catalyst ratio= 500, followed by a solution of t-butylbenzyl alcohol in toluene to make the monomer:initiator ratio=500. The tube was briefly connected to a vacuum line to remove the toluene and was then sealed with a torch. The sealed tube was placed in an oil bath controlled at 180° C. After 2 hours, the tube was removed from the bath, cooled, and was broken to recover the polymer. Dissolution of the polymer in toluene and precipitation of the polymer in cold methanol gave a polymer with a glass transition temperature of 22° C.

Example 19

Solution Polymerization of AB Monomers 3-ethyl-6-methyl-1,4-dioxane-2,5-dione 0.7g (4 mmol) of 3-ethyl-6-methyl-1,4-dioxane-2,5-dione was added to a flask and the flask was heated to 50° C. under vacuum overnight. The vessel was back-filled with argon, and 20 mL of toluene were added by vacuum transfer. A solution of Sn(2-ethylhexanoate)$_2$ in toluene was added using a syringe, to give a monomer:catalyst ratio=300, followed by a solution of t-butylbenzyl alcohol in toluene to make the monomer:initiator ratio=100. The flask was heated to 110° C., and the polymerization was sampled from time to time to determine the degree of conversion. After 150 minutes (91% conversion), the polymerization was terminated by adding 2 mL of 2N HCl, and the toluene solution was washed with water until the pH of the washings reached 7. The polymer was precipitated into cold methanol to give a polymer with a glass transition at 22° C., number average molecular weight of 4500, and a polydispersity of 1.3.

Catalysts useful for the ring opening polymerization generally require a metal such as Al, Sn, Fe, Bi, La, or other elements with a hydroxy or alkoxyl ligand. This is shown in Scheme 6. To initiate the polymerization, the alkoxy or hydroxy group is transferred from the metal to the glycolide ring as shown below.(1) A second class of catalysts comprises inorganic or organometallic complexes that require a co-catalyst to initiate polymerization to begin. The most common example is Sn(2-ethylhexanoate)$_2$.(2) This compound does not have an OR or OH group attached to the metal, and thus the first step is the reaction of water or alcohol to form a Sn-OR species (shown at top right). Once formed, the reaction proceeds as with the first class of catalysts. Note that the number of polymer chains initiated is defined by the number of hydroxy and alkoxy species present in the reaction as H$_2$O or ROH. If the catalyst/initiator ratio is >1, then the number of chains initiated is less than the number of catalyst molecules. If the catalyst/initiator ratio is <1, then the opposite is true since the growing polymer chains are alkoxides and can readily exchange with alcohols or water. Thus, controlling the moisture in a lactide polymerization is critical. The Example (3) is with ethyl glycolide.

Scheme 6

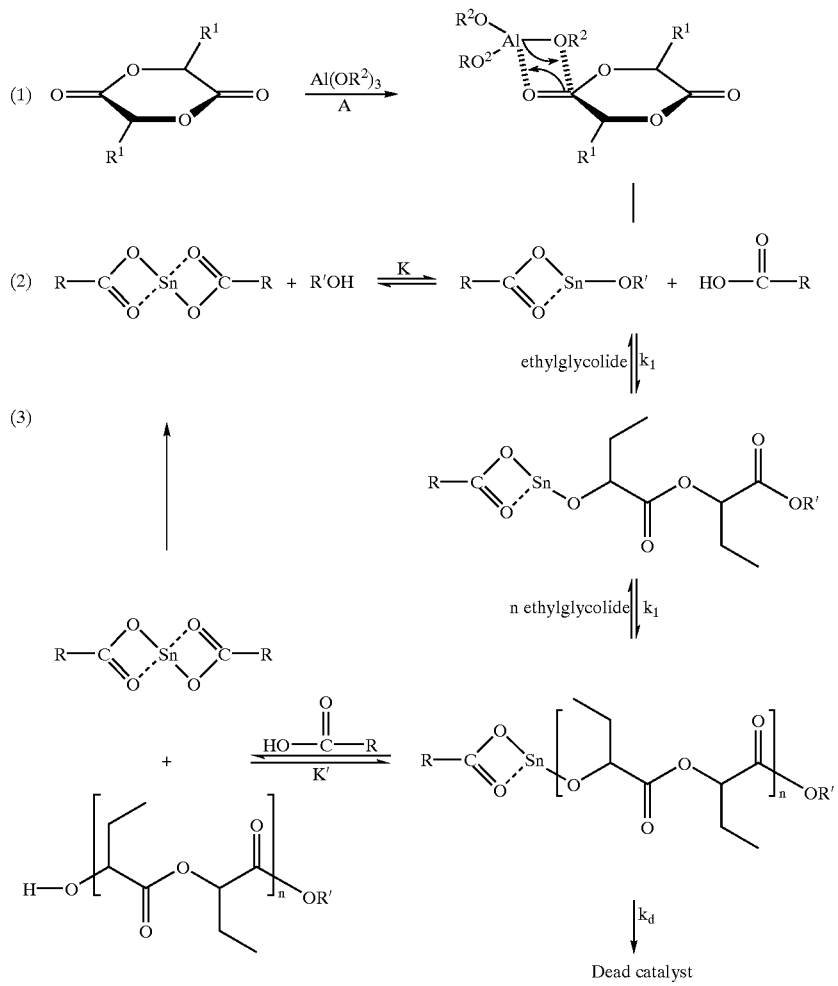

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached hereto.

We claim:

1. A process for the preparation of a polymer which comprises:

(a) providing a racemic mixture of an anhydrous dimeric cyclic ester of the formula:

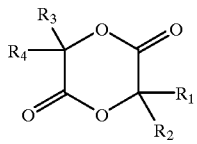

wherein $R_1$ and $R_3$ are selected from the group consisting of linear, branched and unsaturated alkyl containing 1 to 24 carbon atoms, aryl, and aromatic, and wherein $R_2$ and $R_4$ are selected from the group consisting of hydrogen and methyl;

(b) mixing a racemic anhydrous metal organic ligand catalyst with the racemic mixture of an anhydrous dimeric cyclic ester under anhydrous conditions to provide a reaction mixture;

(c) heating the reaction mixture to polymerize the dimeric cyclic ester to form the polymer in the reaction mixture by living polymerization of the mixture without premature termination of the polymerization; and (d) removing the polymer from the reaction mixture, wherein the steps (a) to (d) are conducted in the presence of less than 2 mole percent water based upon the ester.

2. The process of claim 1 wherein the reaction mixture in step (c) is heated to a temperature of between about 20° C. and 200° C. to polymerize the cyclic ester.

3. The process of claim 1 wherein the cyclic ester is an R,S cyclic ester.

4. The product of the process of any one of claims 1, 2 or 3 wherein the polymer has a Polymer Dispersity Index (PDI) of between about 1 and 1.6.

5. A poly(dimeric cyclic ester) as the product of the process of claim 1 having a Polymer Dispersity Index of between about 1 and 2.

6. A process for the preparation of a crystalline polymer of a dimeric cyclic ester which comprises reacting a racemic mixture of a dimeric cyclic ester with a metal organic ligand catalyst which is racemic so that the crystalline polymer is produced in a living polymerization of the mixture which is not prematurely terminated.

7. The process of claim 6 wherein the organic ligand is a racemic salbinap as shown in FIG. 2 with aluminum as the metal.

8. The process of claim 6 wherein the metal is selected from the group consisting of Y, Sc lanthanide elements, Group 14, transition elements, and Group 13 elements except for thallium.

9. The process of claim 6 wherein the dimeric cyclic ester has the formula:

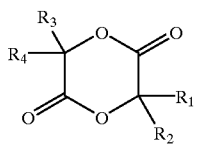

wherein $R_1$ and $R_3$ are selected from the group consisting of linear, branched, and unsaturated alkyl containing 1 to 24 carbon atoms and aryl and $R_2$ and $R_4$ are selected from the group consisting of hydrogen and methyl.

10. The process of any of claims 6, 7, 8 or 9 wherein the catalyst is rac-(salbinap) MOAlk wherein M is the metal and Alk is a lower alkyl containing 1 to 6 carbon atoms.

11. The process of any one of claims 6, 7, 8 or 9 wherein the catalyst is rac-(salbinap)AlEt wherein Et is ethyl.

12. The process of any one of claims 6, 7, 8 or 9 wherein the catalyst is rac-(salbinap)AlO$^i$Pr wherein $^i$Pr is isopropyl.

13. A process for the preparation of a crystalline polyactic acid (PLA) which includes poly(L-lactide) and poly(D-lactide) polymer domains which comprises reacting a racemic mixture of a lactide with a racemic metal organic ligand catalyst which is racemic so that the crystalline PLA is produced in a living polymerization without premature termination of the polymerization.

14. The process of claim 13 wherein the organic ligand is a racemic salbinap as shown in FIG. 2 with aluminum as the metal.

15. The process of claim 13 wherein the metal is selected from the group consisting of Y, Sc lanthanide elements, Group 14, transition elements, and Group 13 elements except for thallium.

16. The process of claim 13 wherein the lactide has the formula:

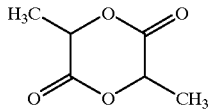

17. The process of claim 13 wherein the lactide has the formula:

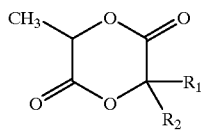

wherein $R_1$ is selected from the group consisting of linear, branched and unsaturated alkyl containing 1 to 24 carbons and aryl, and $R_2$ is selected from the group consisting of methyl and hydrogen.

18. The process of any one of claims 13, 14, 15, 16, or 17 wherein the catalyst is rac-(salbinap) MOAlk wherein M is the metal and Alk is a lower alkyl containing 1 to 6 carbon atoms.

19. The process of any one of claims 13, 14, 15, 16, or 17 wherein the catalyst is rac-(salbinap)AlOEt wherein Et is ethyl.

20. The process of any one of claims 1, 2, 3, 4 or 5 wherein the catalyst is rac-(salbinap)AlO$^i$Pr wherein $^i$Pr is isopropyl as shown in FIG. 2.

21. A process for the preparation of a polymandelide homopolymer which comprises:

(a) providing an anhydrous mandelide;

(b) mixing the anhydrous mandelide with a metal organic ligand catalyst for the mandelide under anhydrous conditions to provide a reaction mixture;

(c) heating the reaction mixture to polymerize the mandelide in the reaction mixture to form the polymandelide in a living polymerization without premature termination of polymerization; and (d) separating the polymandelide from the reaction mixture, wherein the steps (a) to (d) are conducted in the presence of less than 2 mole percent water based upon the mandelide monomer.

22. The process of claim 21 wherein the reaction mixture in step (c) is heated to between about 20 to 200° C. to polymerize the mandelide.

23. The process of claim 21 wherein the mandelide is and R, S mandelide.

24. The process of any one of claims 21, 22 or 23 wherein the solvent is removed from the reaction mixture in step (b) and then reaction mixture is heated in step (c) as a melt to polymerize the mandelide.

25. The process of any one of claims 21, 22 or 23 wherein a solvent is introduced into the reaction mixture in step (b) along with an initiator for the reaction and then the reaction mixture is heated in step (c) to polymerize the mandelide.

* * * * *

UNITED STATES PATENT AND TRADEMARK OFFICE
CERTIFICATE OF CORRECTION

PATENT NO. : 6,469,133 B2
DATED : October 22, 2002
INVENTOR(S) : Gregory L. Baker and Milton R. Smith, III It is certified that error appears in the above-identified patent and that said Letters Patent is hereby corrected as shown below:

<u>Column 3,</u>
Line 1, "temperature (T)" should be -- temperature (Tg) --.

<u>Column 6,</u>
Line 34, "the Tm for" should be -- the $T_m$ for --.

<u>Column 13,</u>
Line 15, "(Tg of 550C)" should be -- (Tg of 55°C) --.

<u>Column 14,</u>
Line 6, "expected lead to" should be -- expected to lead to --.

<u>Column 16,</u>
Line 21, "137,00 g/mol" should be -- 137,000 g/mol --.

<u>Column 20,</u>
Line 54, "CDCl$_3$): 5 5.9" should be -- (CDCl$_3$) δ 5.9 --.

<u>Column 24,</u>
Line 7, "poly(ethylmethyolglycolide" should be -- poly(ethylmethylglycolide --

<u>Column 28,</u>
Line 2, "26A and 2B" should be -- 26A and 26B --.
Line 4, "13C NMR" should be -- $^{13}$C NMR --.

<u>Column 32,</u>
Line 14, "CDCl$_3$) 5 168" should be -- (CDCl$_3$) δ 168 --.

<u>Column 36,</u>
Equation, "$k_1$" should be -- $k_p$ --.

UNITED STATES PATENT AND TRADEMARK OFFICE
CERTIFICATE OF CORRECTION

PATENT NO. : 6,469,133 B2
DATED : October 22, 2002
INVENTOR(S) : Gregory L. Baker and Milton R. Smith, III It is certified that error appears in the above-identified patent and that said Letters Patent is hereby corrected as shown below:

<u>Column 37,</u>
Line 34, "polyactic" should be -- polylactic --.

Signed and Sealed this

Fifteenth Day of April, 2003

JAMES E. ROGAN
*Director of the United States Patent and Trademark Office*